US012731155B2

(12) United States Patent
Ziegler et al.

(10) Patent No.: US 12,731,155 B2
(45) Date of Patent: Sep. 8, 2026

(54) UNIFIED PLATFORM FOR SALES, MARKETING AND GUEST INTELLIGENCE

(71) Applicant: PANSO LLC, Tiburon, CA (US)

(72) Inventors: Britney Ziegler, Tiburon, CA (US); Anuj Luthra, Tiburon (IN)

(73) Assignee: PANSO LLC, Tiburon, CA (US)

( * ) Notice: Subject to any disclaimer, the term of this patent is extended or adjusted under 35 U.S.C. 154(b) by 0 days.

(21) Appl. No.: 19/448,062

(22) Filed: Jan. 13, 2026

(65) Prior Publication Data

US 2026/0203767 A1 Jul. 16, 2026

Related U.S. Application Data

(60) Provisional application No. 63/744,777, filed on Jan. 13, 2025.

(51) Int. Cl.
*G06Q 30/01* (2023.01)

(52) U.S. Cl.
CPC .................................... *G06Q 30/01* (2013.01)

(58) Field of Classification Search
CPC ............................. G06Q 30/01; G06Q 30/015
(Continued)

(56) References Cited

U.S. PATENT DOCUMENTS 8,095,386 B2 * 1/2012 Lassetter ................ G16H 15/00 707/762
8,838,522 B1 * 9/2014 Brundage ................ G06N 5/04 706/54

(Continued)

OTHER PUBLICATIONS

Matt G, "Merge name forms for same person found via NER with Spacy", Dec. 3, 2021, retrieved from https://stackoverflow.com/questions/70214048/merge-name-forms-for-same-person-found-via-ner-with-spacy (Year: 2021).*

*Primary Examiner* — Jessica Lemieux
*Assistant Examiner* — Joshua D Schneider
(74) *Attorney, Agent, or Firm* — PIERSON FERDINAND LLP; Keats Quinalty

(57) ABSTRACT

A computer-implemented method for maintaining unified guest identity records across heterogeneous hospitality data systems. The method receives guest interaction data from independent data sources operating on different schemas, normalizes identifiers through standardization algorithms, and applies two-stage matching comprising deterministic cryptographic hashing followed by probabilistic Bayesian inference. Core attributes are stored in a relational database with strong consistency guarantees while behavioral data is maintained in a document database with eventual consistency, synchronized through a change data capture mechanism providing near real-time synchronization. The identity resolution engine operates continuously in real-time, reducing storage requirements compared to systems allowing duplicate records. The system further implements a predictive segmentation model using online learning to adjust parameters in real-time while preserving accuracy for previously learned patterns. An event-driven workflow orchestration architecture records state-changing guest actions as immutable events and dispatches them to independent CRM, marketing automation, event management, and analytics modules that autonomously respond without centralized orchestration, enabling high-throughput processing with low latency.

10 Claims, 22 Drawing Sheets

(58) Field of Classification Search
USPC .......................................................... 705/342
See application file for complete search history.

(56) References Cited

U.S. PATENT DOCUMENTS

2019/0012367 A1* 1/2019 Bari ...................... G06F 16/287
2023/0004573 A1* 1/2023 Rupanagudi ........ H04L 63/0209

* cited by examiner

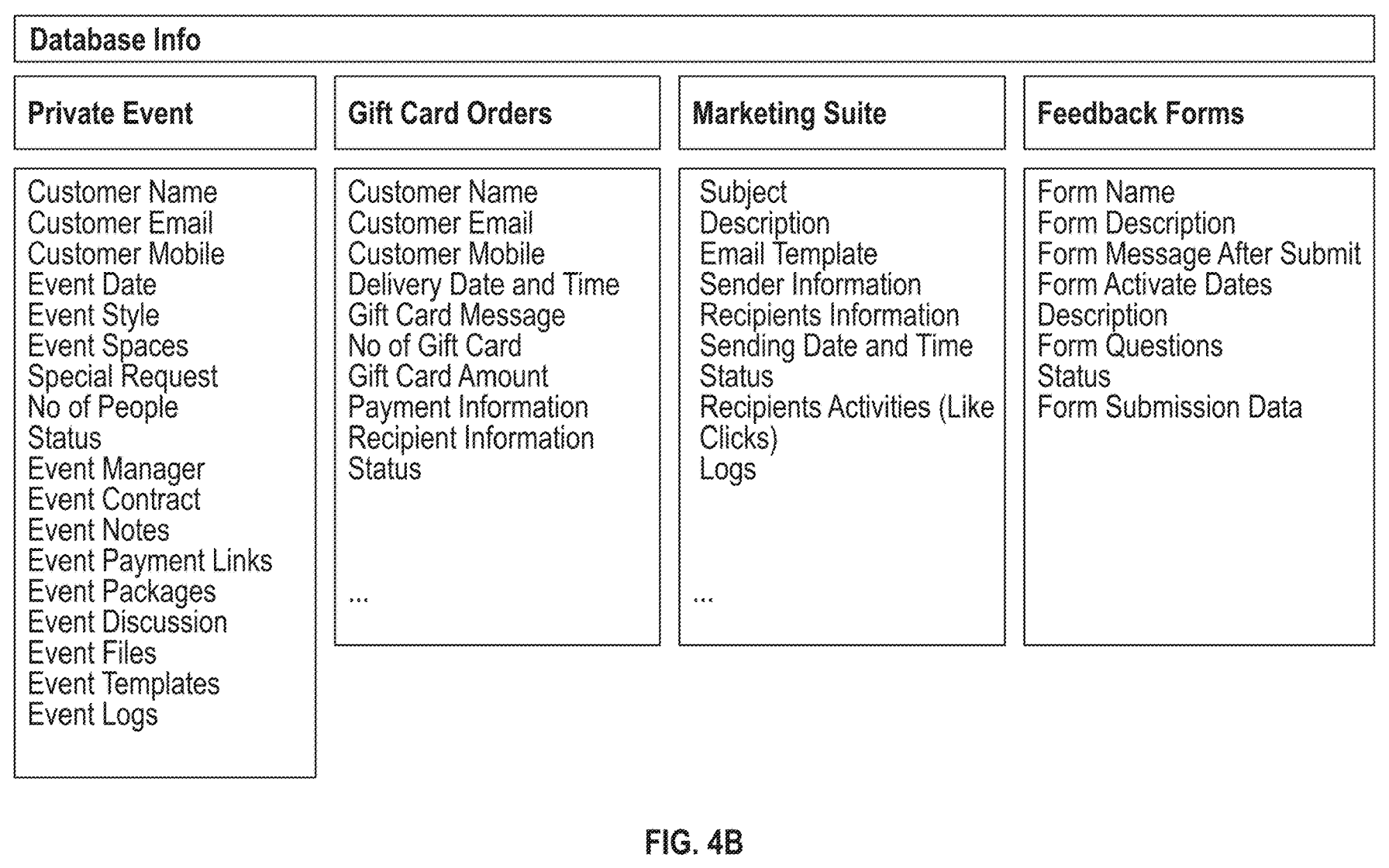

Database Info

Private Event

Customer Name
Customer Email
Customer Mobile
Event Date
Event Style
Event Spaces
Special Request
No of People
Status
Event Manager
Event Contract
Event Notes
Event Payment Links
Event Packages
Event Discussion
Event Files
Event Templates
Event Logs Gift Card Orders Customer Name
Customer Email
Customer Mobile
Delivery Date and Time
Gift Card Message
No of Gift Card
Gift Card Amount
Payment Information
Recipient Information
Status
...

Marketing Suite

Subject
Description
Email Template
Sender Information
Recipients Information
Sending Date and Time
Status
Recipients Activities (Like Clicks)
Logs
...

Feedback Forms

Form Name
Form Description
Form Message After Submit
Form Activate Dates
Description
Form Questions
Status
Form Submission Data

FIG. 4B

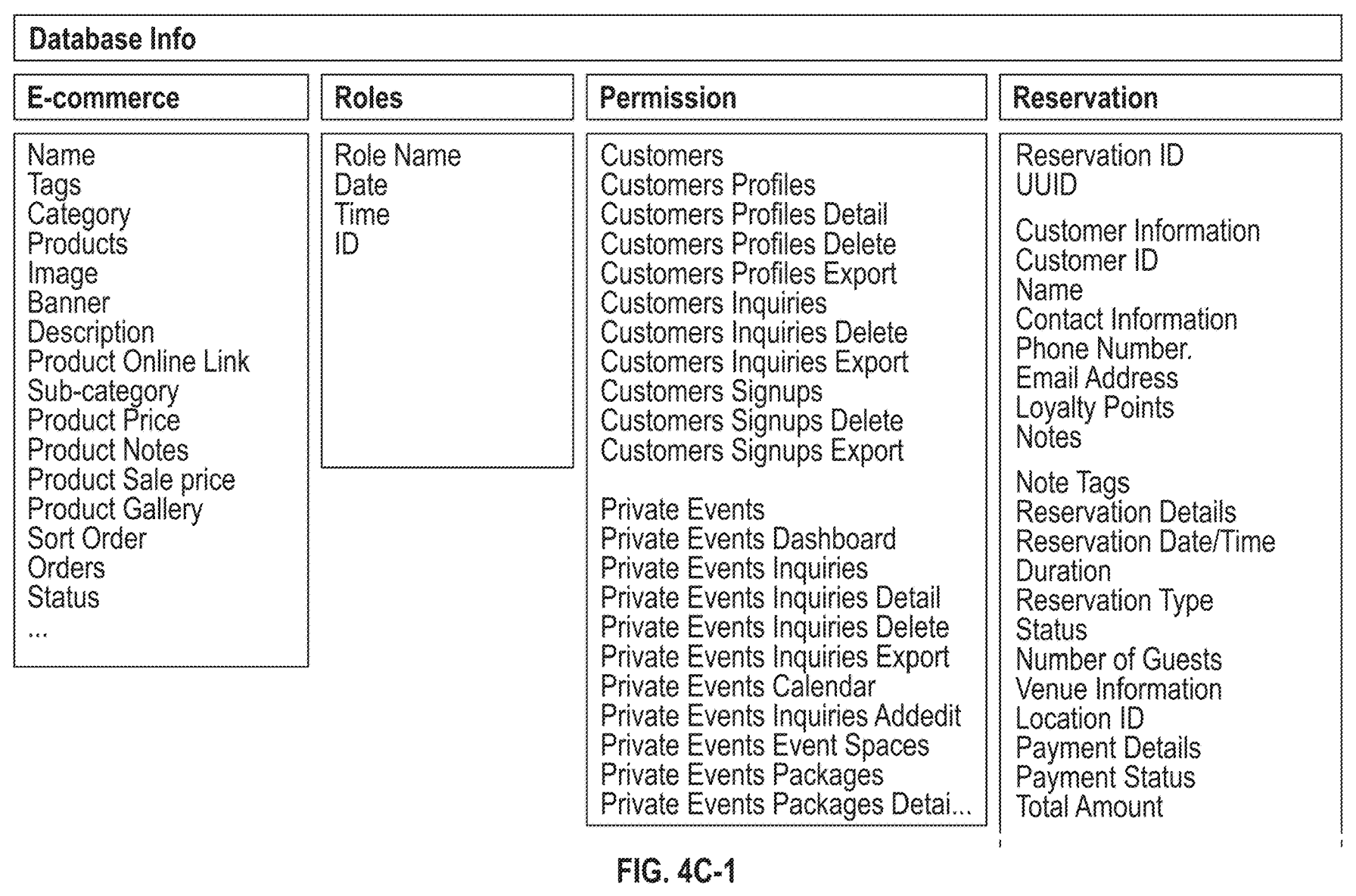

Database Info

E-commerce

Name
Tags
Category
Products
Image
Banner
Description
Product Online Link
Sub-category
Product Price
Product Notes
Product Sale price
Product Gallery
Sort Order
Orders
Status
...

Roles

Role Name
Date
Time
ID

Permission

Customers
Customers Profiles
Customers Profiles Detail
Customers Profiles Delete
Customers Profiles Export
Customers Inquiries
Customers Inquiries Delete
Customers Inquiries Export
Customers Signups
Customers Signups Delete
Customers Signups Export Private Events
Private Events Dashboard
Private Events Inquiries
Private Events Inquiries Detail
Private Events Inquiries Delete
Private Events Inquiries Export
Private Events Calendar
Private Events Inquiries Addedit
Private Events Event Spaces
Private Events Packages
Private Events Packages Detai...

Reservation

Reservation ID
UUID

Customer Information
Customer ID
Name
Contact Information
Phone Number.
Email Address
Loyalty Points
Notes Note Tags
Reservation Details
Reservation Date/Time
Duration
Reservation Type
Status
Number of Guests
Venue Information
Location ID
Payment Details
Payment Status
Total Amount

FIG. 4C-1

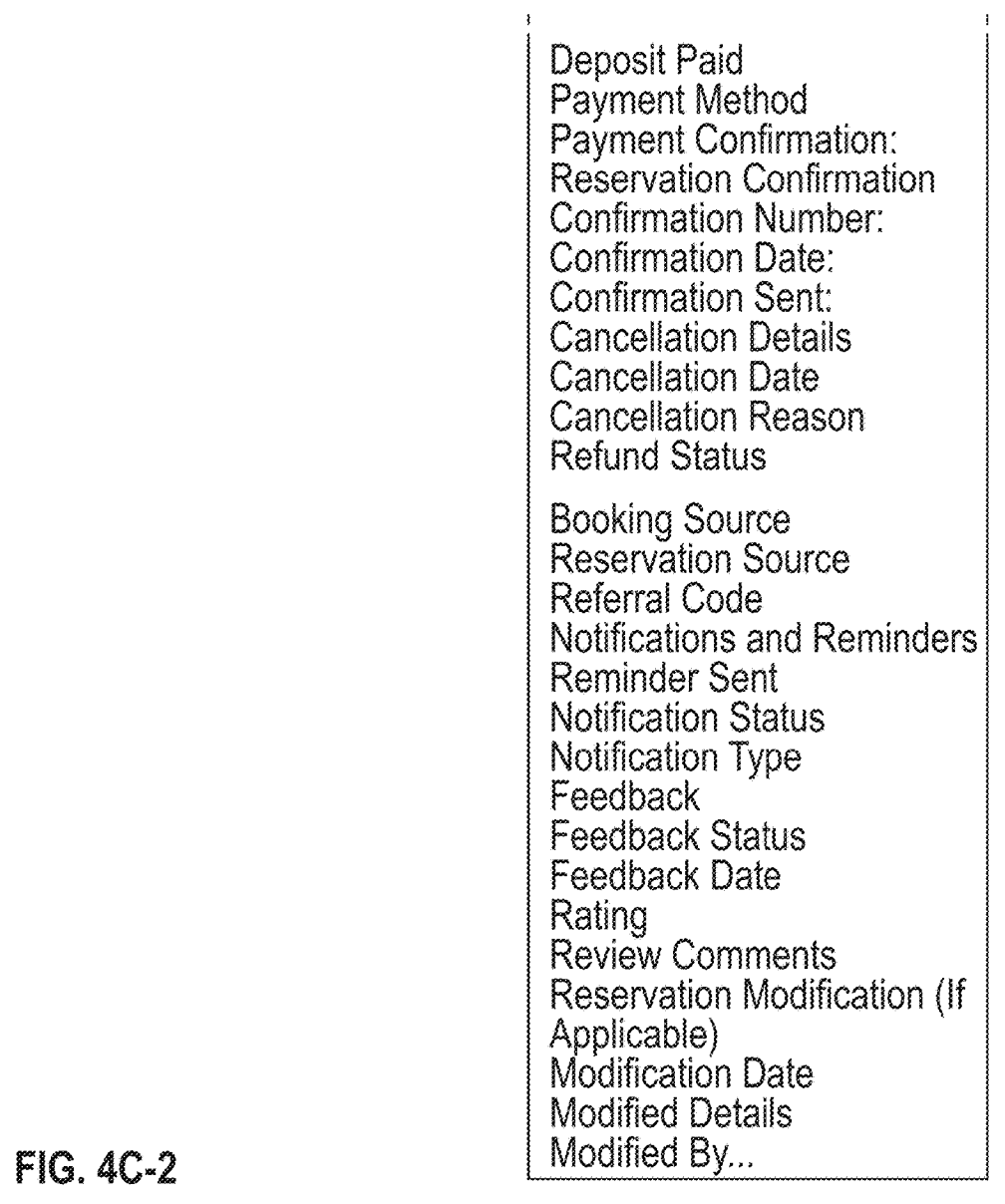

Deposit Paid
Payment Method
Payment Confirmation:
Reservation Confirmation
Confirmation Number:
Confirmation Date:
Confirmation Sent:
Cancellation Details
Cancellation Date
Cancellation Reason
Refund Status Booking Source
Reservation Source
Referral Code
Notifications and Reminders
Reminder Sent
Notification Status
Notification Type
Feedback
Feedback Status
Feedback Date
Rating
Review Comments
Reservation Modification (If Applicable)
Modification Date
Modified Details
Modified By...

FIG. 4C-2

Figure 6:
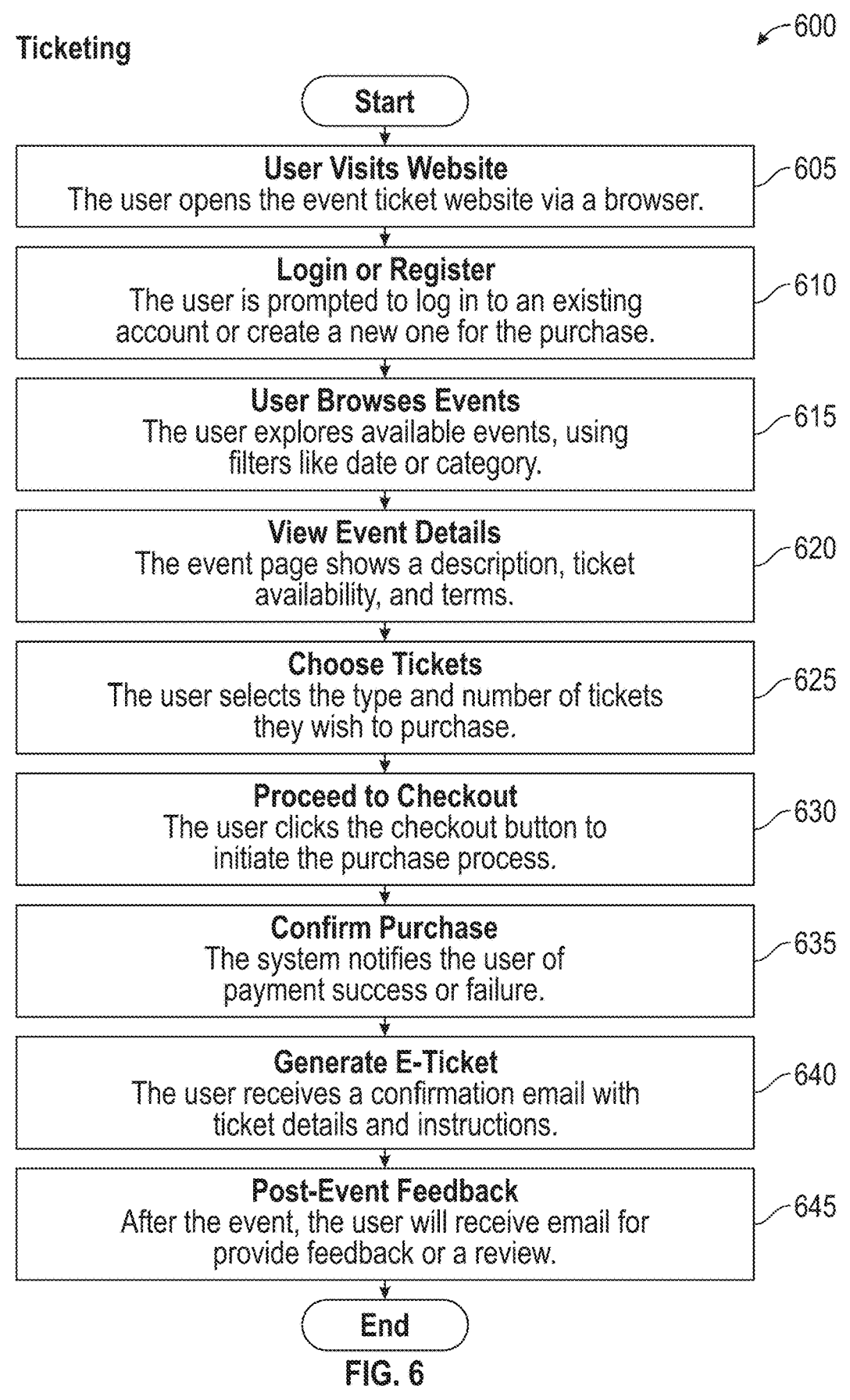

Ticketing

600

Start

User Visits Website
The user opens the event ticket website via a browser.
605

Login or Register
The user is prompted to log in to an existing account or create a new one for the purchase.
610

User Browses Events
The user explores available events, using filters like date or category.
615

View Event Details
The event page shows a description, ticket availability, and terms.
620

Choose Tickets
The user selects the type and number of tickets they wish to purchase.
625

Proceed to Checkout
The user clicks the checkout button to initiate the purchase process.
630

Confirm Purchase
The system notifies the user of payment success or failure.
635

Generate E-Ticket
The user receives a confirmation email with ticket details and instructions.
640

Post-Event Feedback
After the event, the user will receive email for provide feedback or a review.
645

End

Private Event Booking

Start

User Visits Website
The user opens the website via a browser. 805

Login or Register Optional
The user is prompted to log in to an existing account or create. 810

Submit Inquiry
The user fills out a detailed form with event specifics, including event type, preferred date, number of guests, and any special requirements. 815

Receive Availability Info
The user gets notified about the venue's availability via email or phone. If unavailable, they can choose alternate options or modify their request. 820

Request a Customized Proposal
The user requests a customized proposal if additional services or specific setups are required. 825

Review Contract
The user reviews the contract which outlines terms, services, costs, and payment milestones. 830

Approve Contract and Terms
The user signs the contract digitally to confirm agreement with the venue's terms and conditions. 835

Receive Payment Link for Advance 840

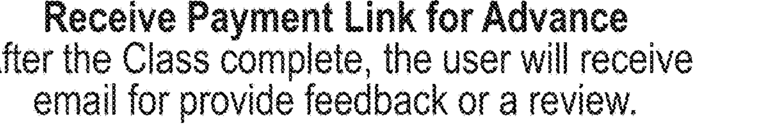

Subscription

Start

User Visits Website
The user opens the subscription platform via a browser. 1305

Login or Register
The user is prompted to log in or create a new account to manage subscriptions. 1310

Browse Subscription Product
The user explores available subscription products, such as monthly, quarterly, or annual options. 1315

View Subscriptions Offers
Each subscription offer displays details like pricing, included benefits, delivery schedule, and terms. 1320

Select Subscription Delivery
The user chooses the preferred delivery. 1325

Proceed to Checkout
The user provides payment details and confirms billing preferences. 1330

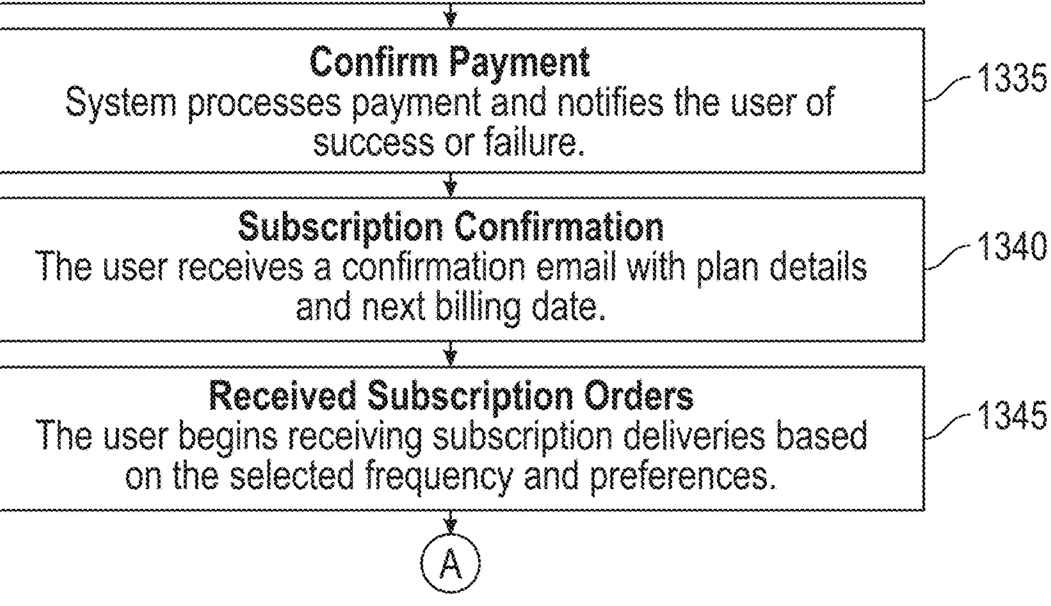

FIG. 13A

| Component | What It Tracks | How It's Logged |
|---|---|---|
| CRM Logs | Profile creation, interactions, tags, channel source | MySQL + activity timeline (with timestamps) |
| Event/Order History | Event/class/session participation | Transaction DB + CRM |
| POS Sync | Orders, spend, items | API sync to guest profile |
| Email/SMS Automation | Opens, clicks, replies | Email tooling logs tied back to CRM guest ID |
| Feedback Forms | Ratings, comments, NPS | Stored per guest → CRM + Feedback DB |
| Calendar Bookings | Event type, status, room | Color-coded, stored by module |
| Login/Access Logs | Last login, device, platform | Session log + last visit widget |
| AI Segmentation | Spend, visit, tags, interaction scoring | Stored in CRM tagging engine (custom logic) |

FIG. 15

Tech Stack with Panso

Reservations / Point of Sale

Reservations/ Payments Data

Panso

Capabilities | Data

Website | 1st
Events | 1st
Ticketing | 1st
CRM | 0,1,3r)
Marketing | 1st
Sales Tools Restaurant

UNIFIED PLATFORM FOR SALES, MARKETING AND GUEST INTELLIGENCE

TECHNICAL FIELD

The present patent application relates to the technical field of distributed database systems and data integration architectures for hospitality management, specifically addressing the technical problems of maintaining unified entity records across heterogeneous data sources with different schemas and ensuring real-time data consistency through hybrid database architectures, identity resolution algorithms, and event-driven workflow orchestration. The invention combines cryptographic hashing, probabilistic matching models, and change data capture mechanisms to improve computer system performance in managing guest identity deduplication, behavioral analytics, and multi-module coordination without manual reconciliation.

BACKGROUND

The hospitality industry has traditionally relied on fragmented point-solution software systems to manage different aspects of restaurant and event operations, including reservations, point-of-sale transactions, ticketing, customer relationship management, marketing automation, and payment processing. Each system maintains isolated data stores with different schemas and update frequencies, creating significant challenges for restaurant operators seeking to maintain a coherent view of guest preferences, spending patterns, and lifecycle engagement. When a guest makes a reservation through one platform, purchases tickets through another, dines at the restaurant, and receives marketing communications from a separate system, their interactions remain siloed across these disconnected tools, preventing operators from understanding true guest lifetime value or coordinating revenue strategies across dining, events, and experiential offerings. This fragmentation results in duplicate guest records, lost context between interactions, and the inability to apply intelligence and automation at the infrastructure layer to improve both operational efficiency and customer experience.

Conventional approaches to addressing this data integration challenge have proven inadequate. Some operators attempt to synchronize data across systems after the fact through periodic batch processes, which introduce significant latency and create temporary inconsistent states where duplicate records exist during the reconciliation window. Others require all integrated systems to adopt a single rigid schema, an impractical solution given the diverse nature of third-party platforms used in the hospitality industry. The absence of a unified, real-time system of record for guest identity and interaction data leaves operators without the technical foundation needed to apply predictive intelligence, coordinate workflows across sales, events, operations, and marketing, or maintain consistent, personalized communication when guest actions span multiple revenue streams. As a result, growth efforts through marketing and guest communications become fragmented, reactive, and difficult to measure. There is a need for a technical solution that maintains a single canonical guest record across heterogeneous data sources through continuous identity resolution and real-time data synchronization, enabling operators to build guest relationships that compound in value over time.

SUMMARY

The present invention discloses a computer-implemented method for maintaining unified guest identity records across heterogeneous hospitality data systems through continuous real-time identity resolution and coordinated data management. The method comprises receiving guest interaction data from multiple independent sources operating on different schemas, normalizing the data through standardized identifier formats and phonetic algorithms, and applying a two-stage matching process that combines deterministic matching using cryptographic hashing with probabilistic matching using Bayesian inference models. The system stores core transactional data in a relational database with strong consistency guarantees while maintaining behavioral and unstructured data in a document database optimized for analytical queries, then synchronizes these databases through a change data capture mechanism. By operating continuously in real-time and maintaining a single canonical guest record rather than allowing duplicates to proliferate, the system reduces storage requirements and database query complexity while enabling operators to maintain coherent guest profiles across all revenue streams.

Beyond identity resolution, the invention provides a unified infrastructure layer upon which multiple hospitality management modules can operate autonomously yet consistently. The system implements predictive segmentation models using online learning algorithms that adjust parameters in real-time as guests interact with the platform, preserving accuracy for previously learned patterns while incorporating new behavioral signals. An event-driven workflow orchestration architecture records state-changing guest actions as immutable events and dispatches these events through a message bus to independent CRM, marketing automation, event management, and analytics modules, each of which autonomously responds to subscribed events without requiring centralized orchestration. This architecture eliminates brittle distributed transaction protocols and enables high-throughput processing with low latency from event creation to downstream completion. The invention further enables construction of household relationship graphs and calculation of influence scores, allowing operators to understand and engage with guests as individuals embedded within relationships rather than as isolated data points.

BRIEF DESCRIPTION OF THE FIGURES

FIGS. 4A, 4B, and 4C show customer touchpoints and data being captured and stored along the customer journey specific to individual modules.

Figure 7:
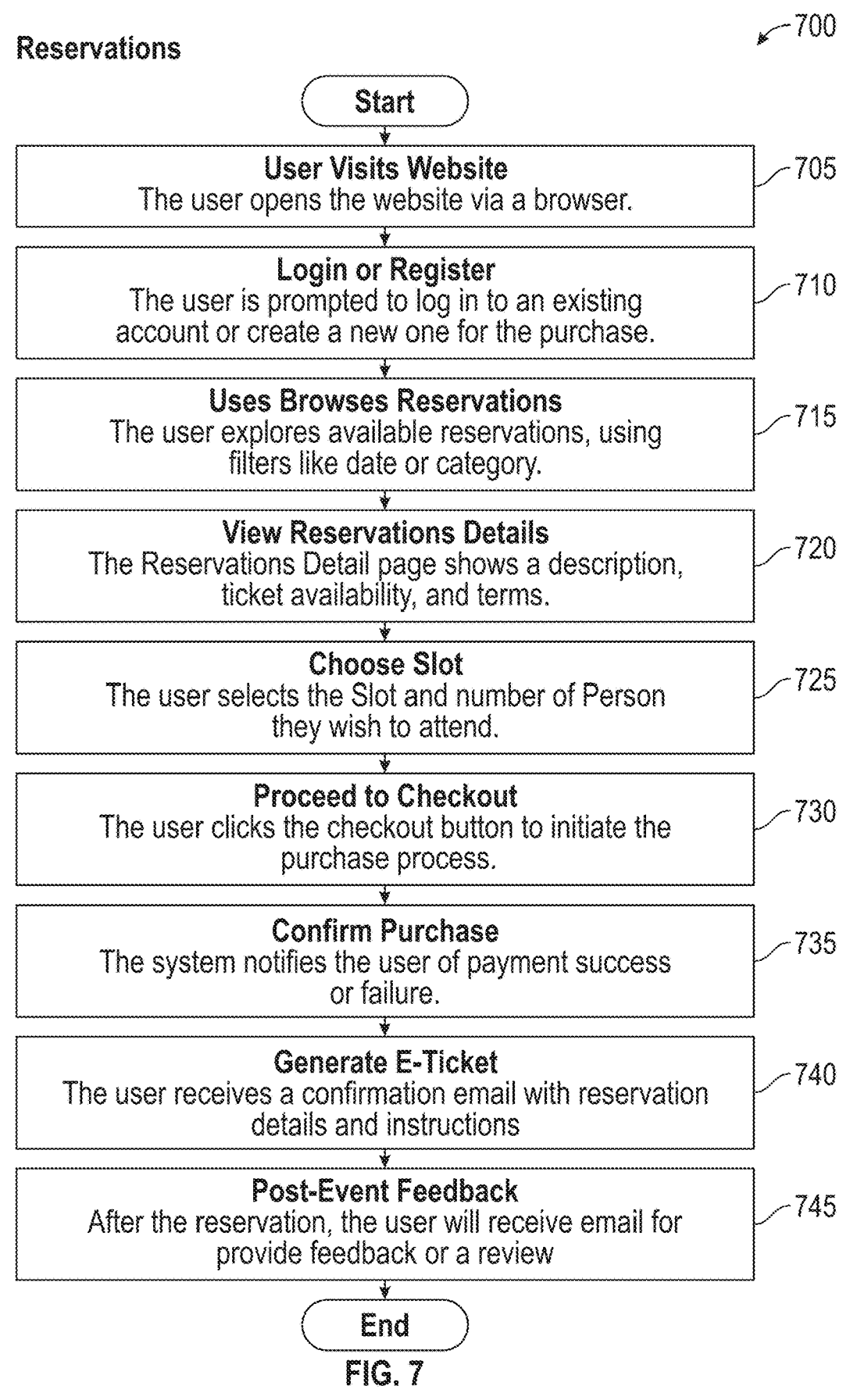

FIGS. 6-13B show exemplary respective mapping for each customer journey by module.

FIG. 15 illustrates an exemplary explanation of Panso tracking an end-to-end customer journey.

DETAILED DESCRIPTION

Figure 1:
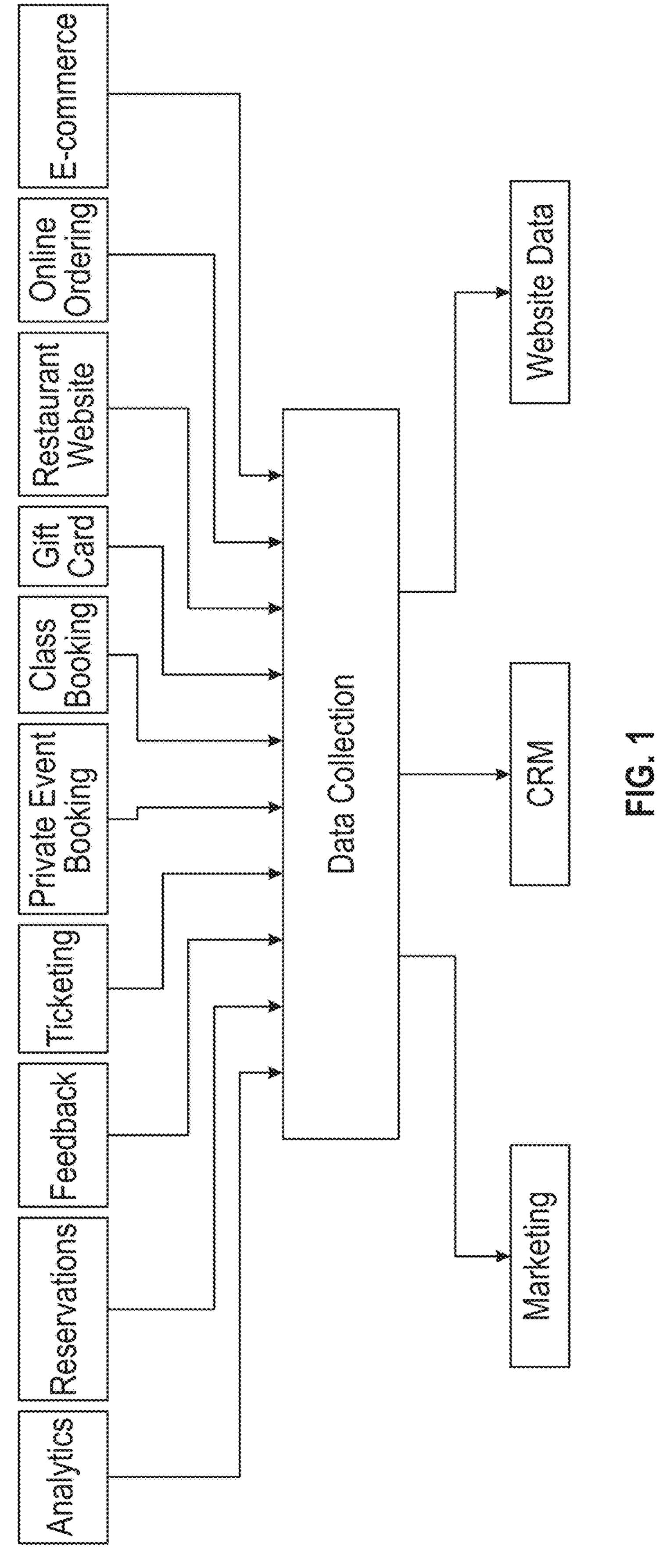
FIG. 1 shows a high level view of data inputs.

Panso is the system of record for revenue and guest relationships in hospitality.

Today, independent restaurants and restaurant groups operate across a fragmented ecosystem of point solutions—reservations, private events, ticketing, marketing, CRM, and payments—each optimized for a narrow function, but none designed to compound intelligence or support long-term growth. These tools capture moments, not relationships. As a result, operators lack a durable foundation for understanding their guests, coordinating revenue workflows, or scaling sustainably without reliance on third-party marketplaces.

Most point solutions in hospitality are built on a fundamentally different incentive structure than operators realize.

Reservation platforms, marketplaces, and marketing tools monetize access not outcomes. Their business models depend on aggregating demand across many operators, retaining control of guest data, and monetizing that data through fees, commissions, or downstream distribution. As a result, guest data, demand signals, and conversion insights often live outside the operator's control, abstracted behind black-box reporting or surfaced selectively.

In these models, data is captured primarily to optimize the platform itself not to serve as a transparent, long-term system of record for the operator. Insights are fragmented across tools, historical context is lost between interactions, and operators receive summaries rather than ownership. These numerous platforms have limitations as it relates to integrating across systems and make it impossible for operators to access even where APIs are available. This prohibits their ability to understand true guest value, coordinate revenue strategies, or compound relationships over time.

Panso is architected with the opposite premise. It is built as a first-party, operator-owned system of record, where data is transparent, portable, and directly usable by the business generating it. Instead of monetizing data through aggregation or resale, Panso delivers that data back to the operator as infrastructure powering execution, intelligence, and growth. This alignment is what enables Panso to function as a neutral foundation rather than a gatekeeper or marketplace.

Panso replaces this fragmentation with a unified, first-party foundation that centralizes guest data and revenue activity into a single, neutral system of record. Rather than competing with individual tools, Panso sits above them owning the data model that governs how demand is created, converted, fulfilled, and retained. This architecture enables operators to control their guest relationships, execute across the full revenue lifecycle, and build durable, scalable businesses without ceding ownership to intermediaries.

In hospitality, demand is created, bookings convert, and experiences are delivered, but without a shared system of record, data breaks at every stage. Each handoff resets context. Guest intent is lost between discovery and booking. Revenue signals fragment between events, dining, and experiences. Relationship continuity erodes after fulfillment. Without a unified foundation, insight cannot compound, and growth remains reactive rather than systematic.

Panso addresses this structural gap by functioning as a foundational data and intelligence platform for hospitality. At its core is the Unified Guest Record-a single, continuously updated system of record that captures every meaningful signal related to how a guest discovers, books, spends, engages, and returns over time.

Surrounding this core, Panso ingests, normalizes, and resolves data across the entire revenue lifecycle: reservation and demand signals, private dining and event revenue, sales activity and conversion history, experiential purchases, on-premise spend, guest preferences and feedback, and ongoing lifecycle marketing engagement. Instead of living in disconnected tools, all of this information resolves to shared entities-guests, households, events, and revenue streams-creating a complete and durable view of customer value.

Because this data is unified at the foundation, Panso enables coordinated workflows, accurate attribution, and true measurement of guest lifetime value. More importantly, it creates the conditions for intelligence and automation to compound over time. Panso functions not as a collection of point tools, but as the system of record that governs how hospitality revenue and relationships are built and sustained.

Technically, Panso centralizes and normalizes data across reservations, events, ticketing, marketing interactions, payments, and sales activity into a single, first-party data model. Rather than synchronizing disconnected tools after the fact, Panso is designed so all guest interactions and revenue-generating actions either originate from—or resolve back into—one authoritative source of truth.

The platform couples this unified data layer with operational workflows that execute directly on top of it. Event booking, ticketing, CRM, marketing automation, and sales pipelines are embedded natively within the system of record, eliminating brittle integrations and manual reconciliation. Because workflows operate against shared entities, state and context persist across the lifecycle enabling accurate follow-through, prioritization, and accountability without data loss between systems.

This architecture enables predictive intelligence and automation to be applied at the infrastructure layer rather than bolted onto individual tools. With consistent schemas and resolved identities, Panso can support demand forecasting, conversion likelihood modeling, revenue prioritization, and automated targeting and follow-ups without external data pipelines. Crucially, automation improves outcomes without increasing operational complexity or headcount, because intelligence is embedded directly into how the system operates.

Panso's system includes a unified data layer and a set of tightly integrated modules that operate directly on top of it: a first-party CRM and identity resolution layer that maintains a single guest and household record; reservations, waitlists, and demand capture; private dining and events management including inquiries, proposals, contracts, and payments; ticketing for experiences, classes, and prepaid programs; marketing and lifecycle communications powered by real guest history; sales pipelines and revenue tracking across all formats; and integrated payments and reporting. Because all modules share the same underlying data model, guest context, revenue signals, and workflow state persist across the lifecycle, enabling coordinated execution, accurate attribution, and intelligence and automation to compound over time without fragmentation.

This document outlines the core technical architecture, CRM data model, customer journey tracking, and platform modules that power Panso. The system combines structured and behavioral data to deliver a unified, scalable system of record for hospitality revenue and guest relationships. The following sections detail how Panso captures, organizes, and enriches customer data, including infrastructure design, identity resolution, lifecycle tracking, security posture, and integration capabilities.

FIG. 1 shows a high level view of data inputs. In at least one aspect, the data inputs are combined in our database, to the outputs achieving sales, marketing, and guest relations (the growth opportunities for the restaurant).

Figure 2:
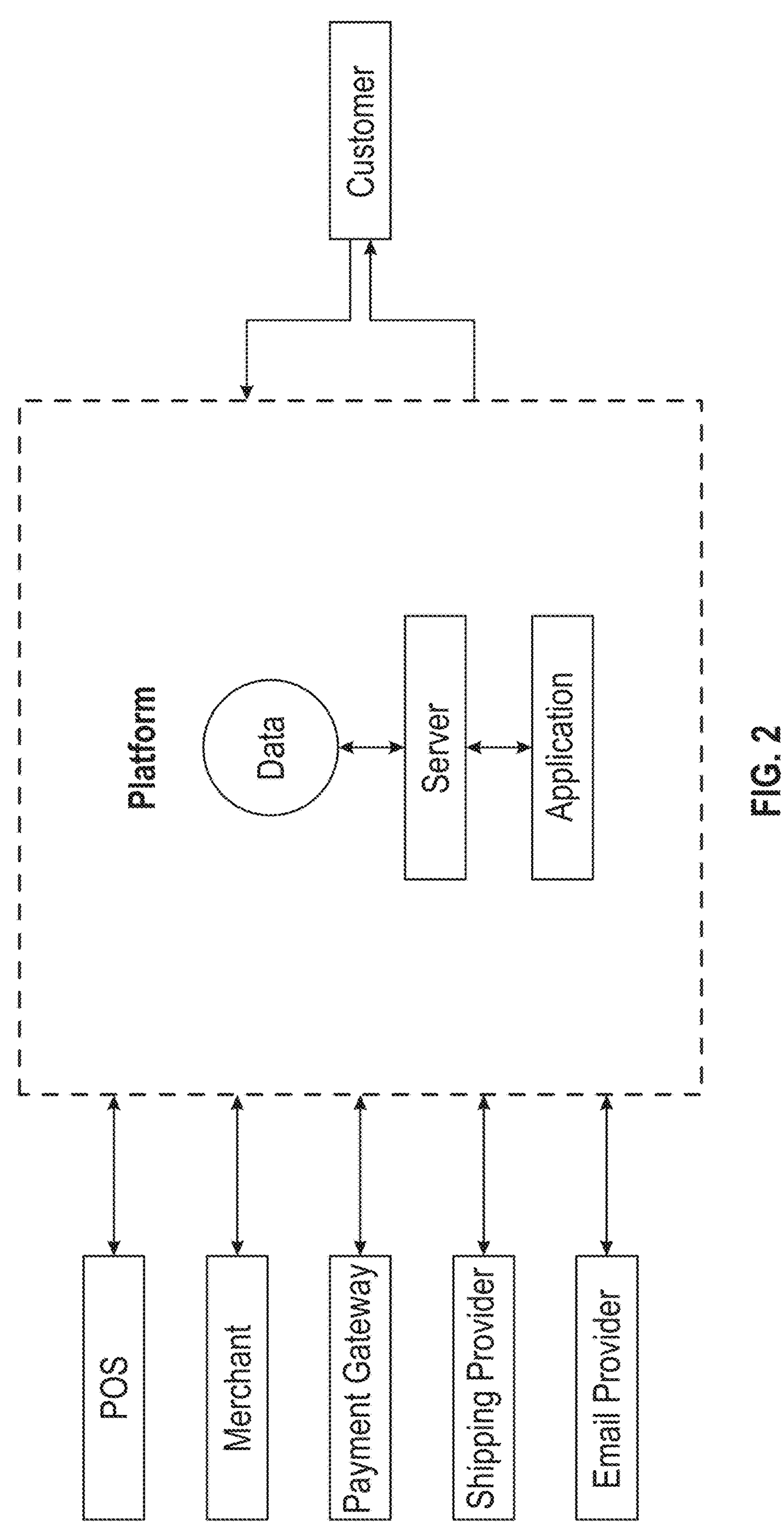
FIG. 2 shows a payment gateway.

FIG. 2 shows a payment gateway.

Figure 3:
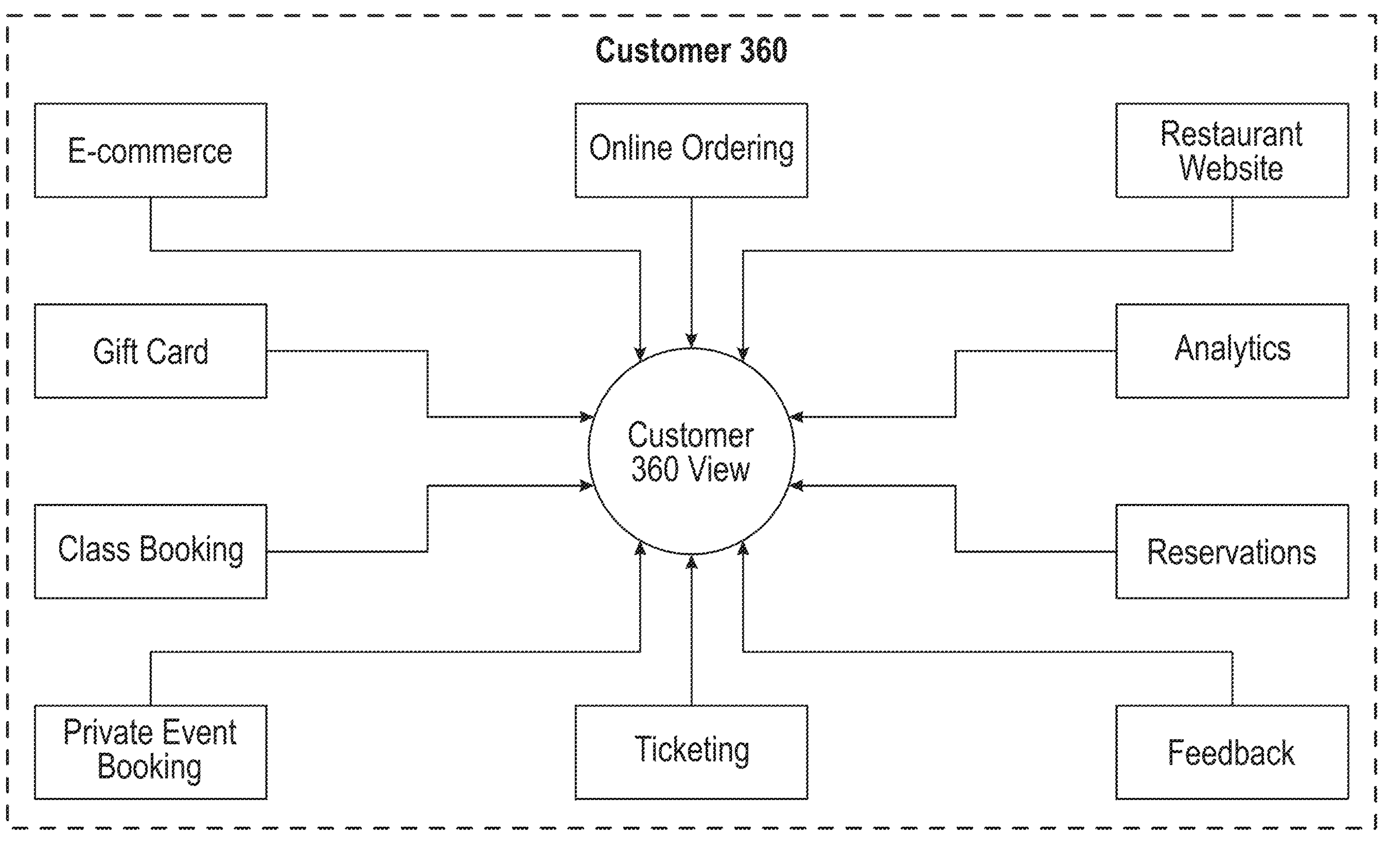
FIG. 3 shows an exemplary unified customer profile.

FIG. 3 shows an exemplary unified customer profile. In at least one aspect, the output is Panso unified customer profile, and, describes CRM and database foundation, which, at least in one embodiment, are a core of an exemplary platform.

Figure 4A:
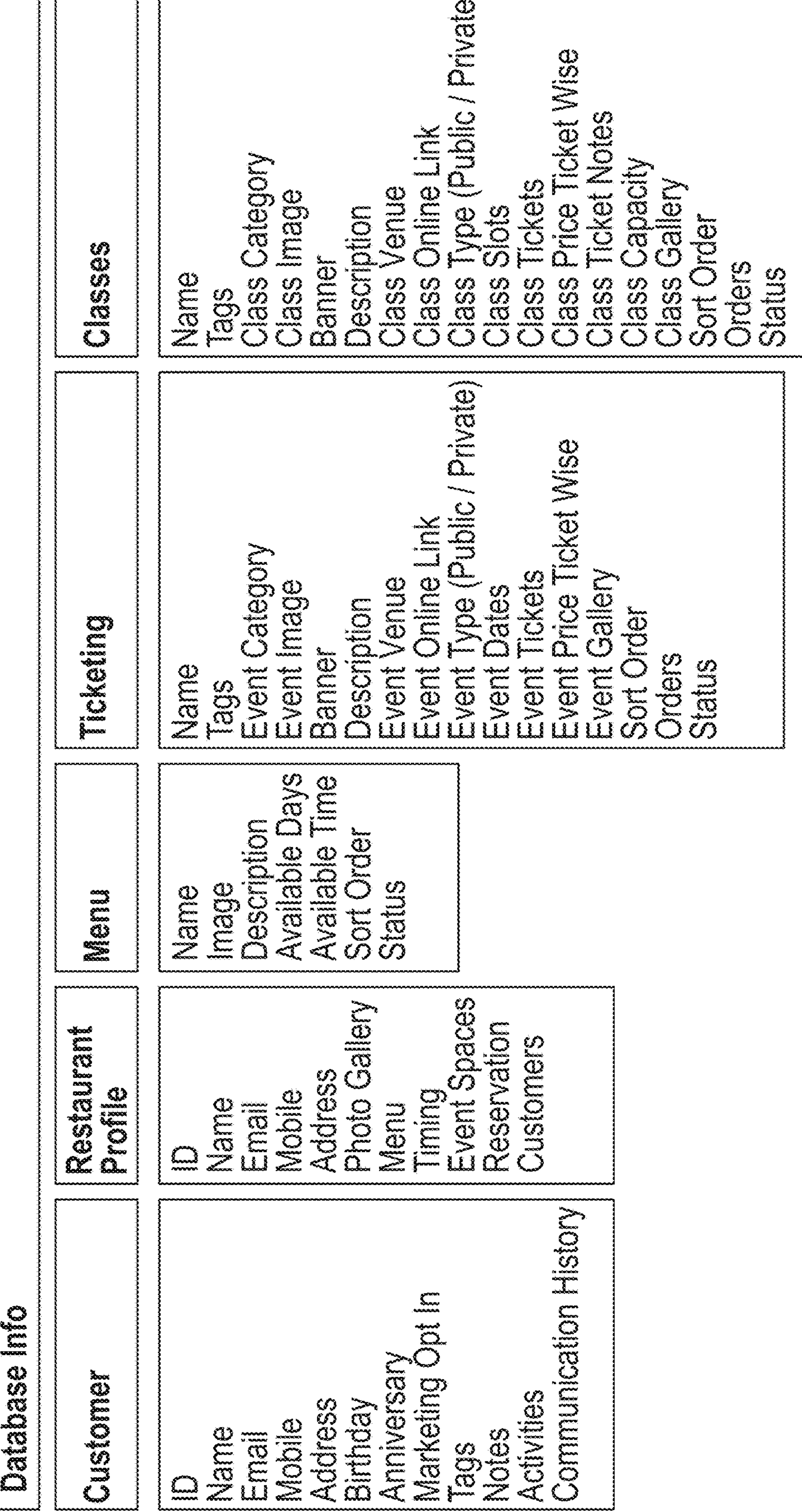

FIGS. 4A, 4B, and 4C show customer touchpoints and data being captured and stored along the customer journey specific to individual modules.

Figure 5:
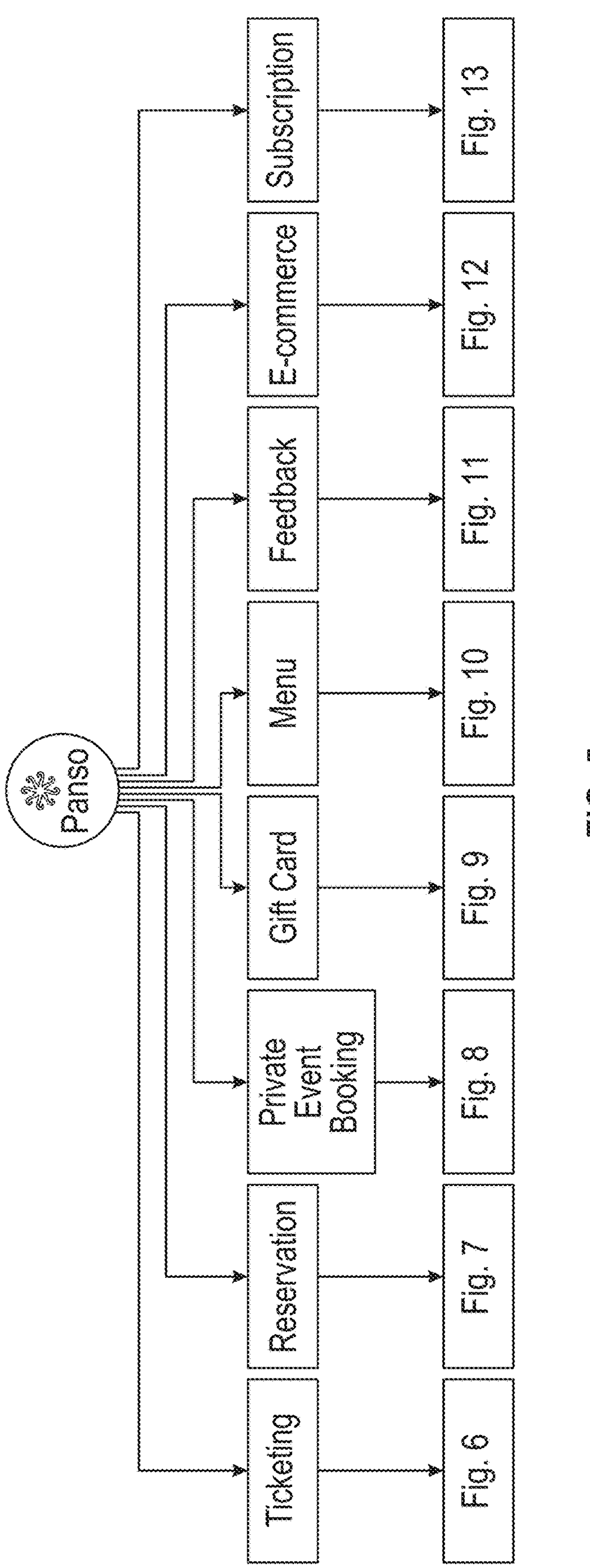
FIG. 5 shows an exemplary journey mapping by module.
Figure 8B:
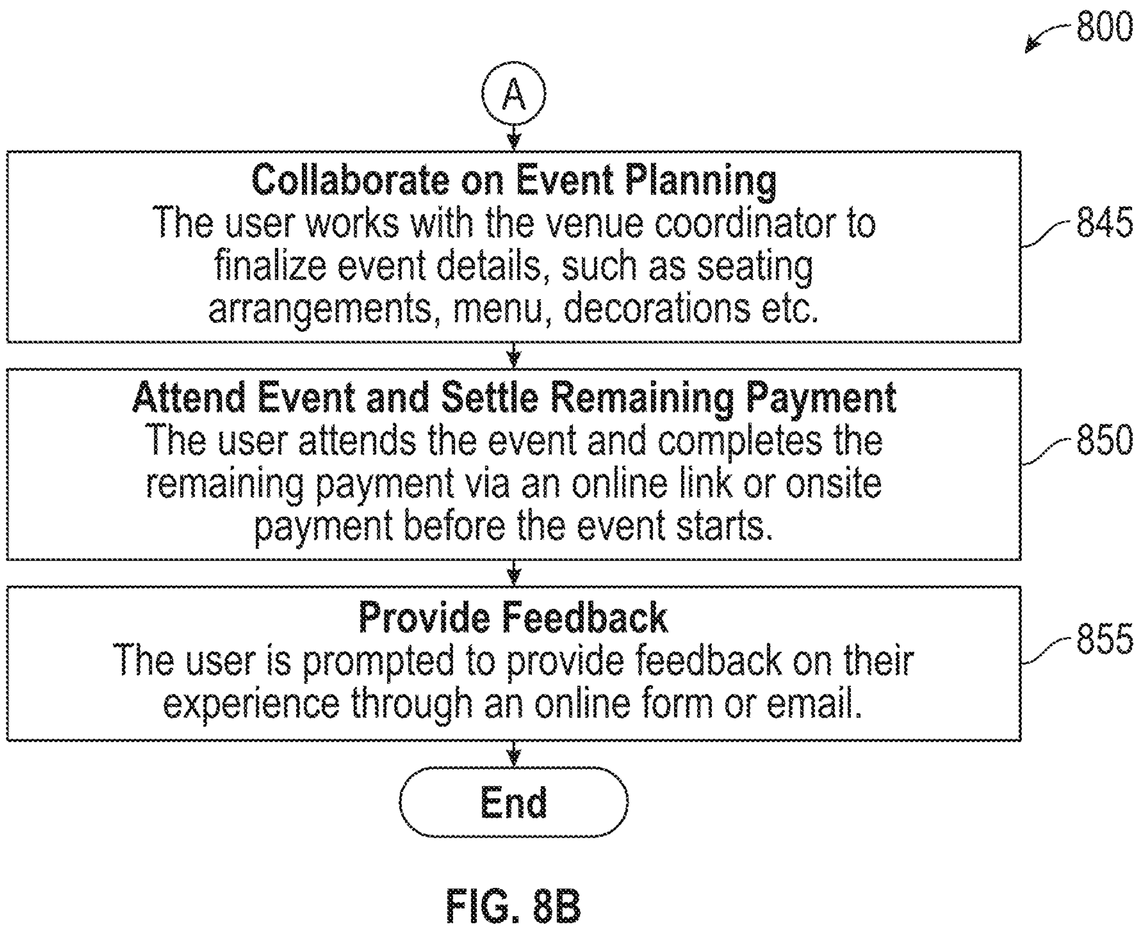
Figure 9A:
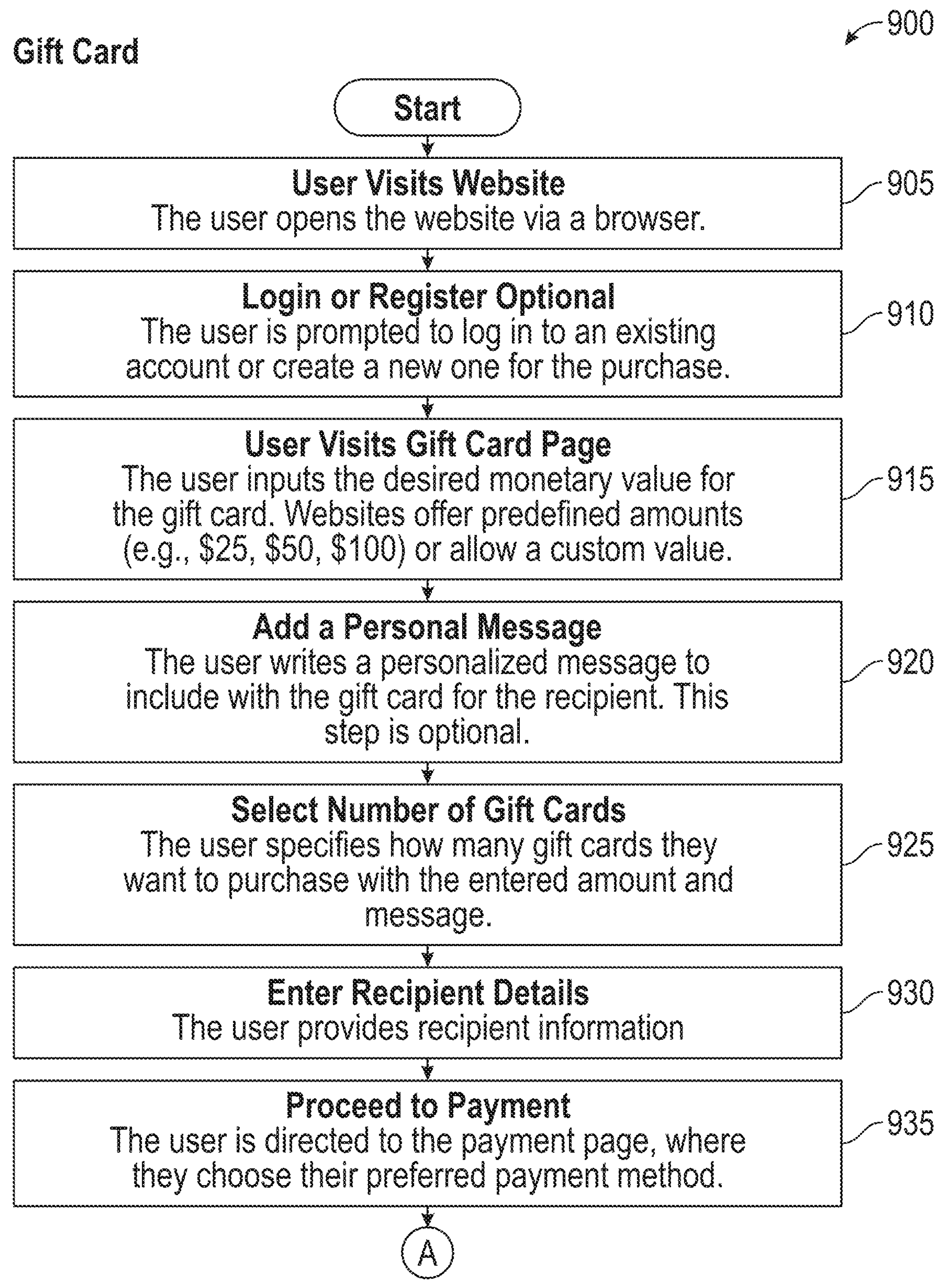
Figure 9B:
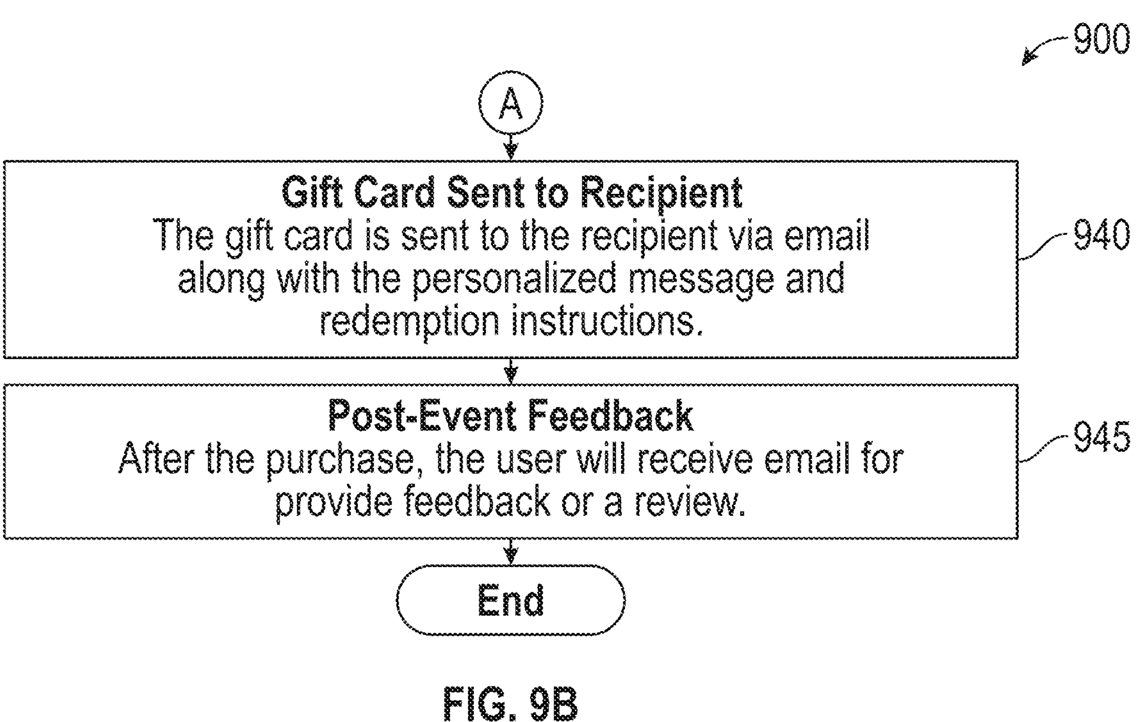
Figure 10:
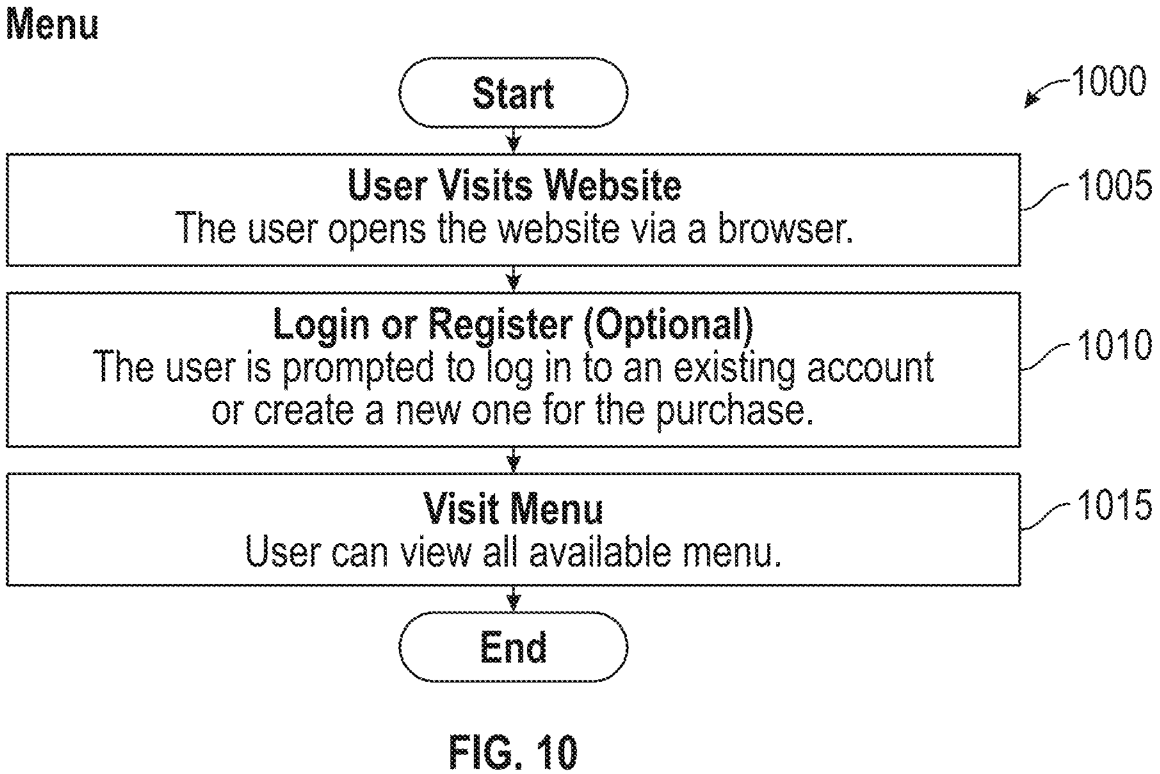
Figure 11:
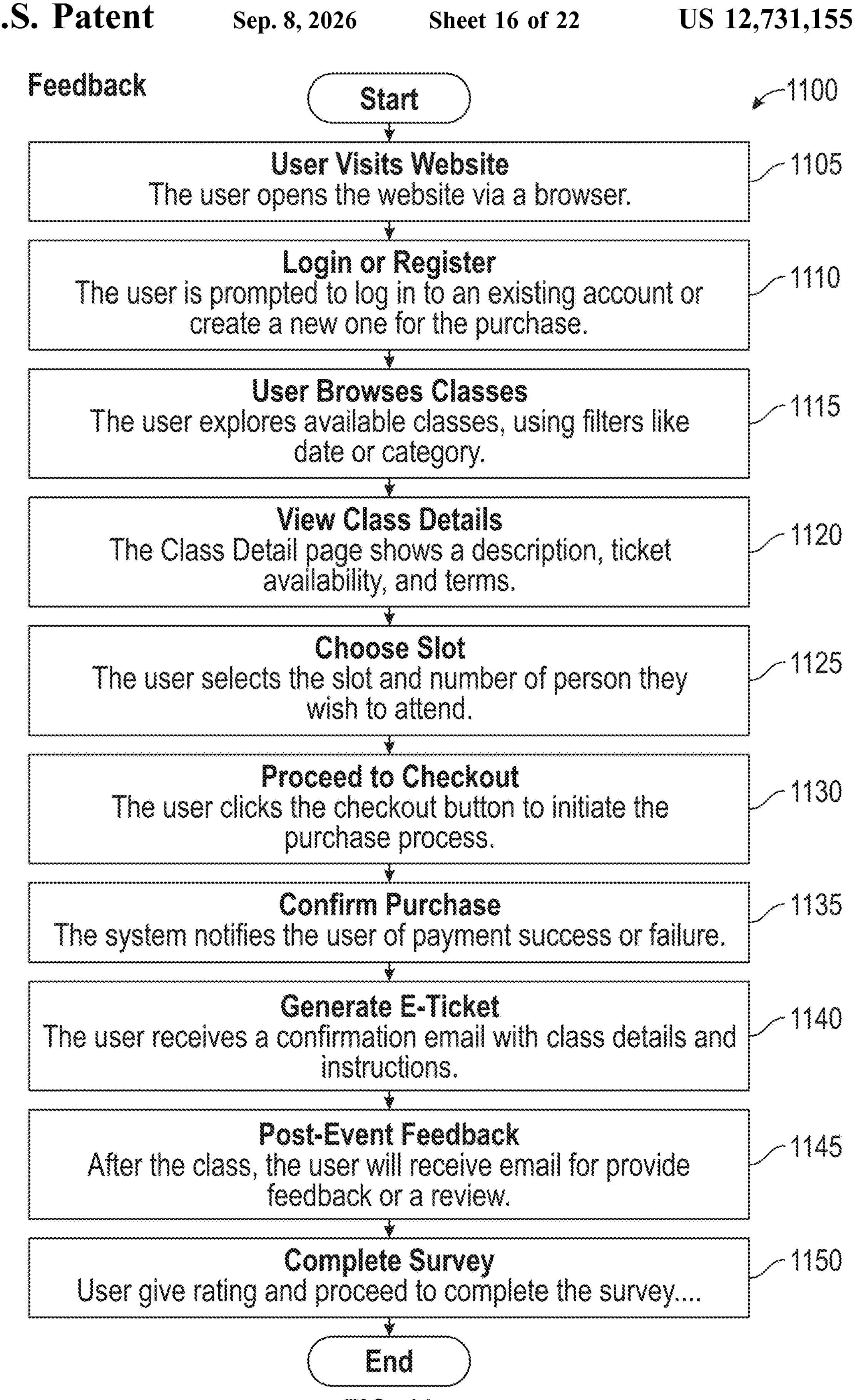
Figure 12:
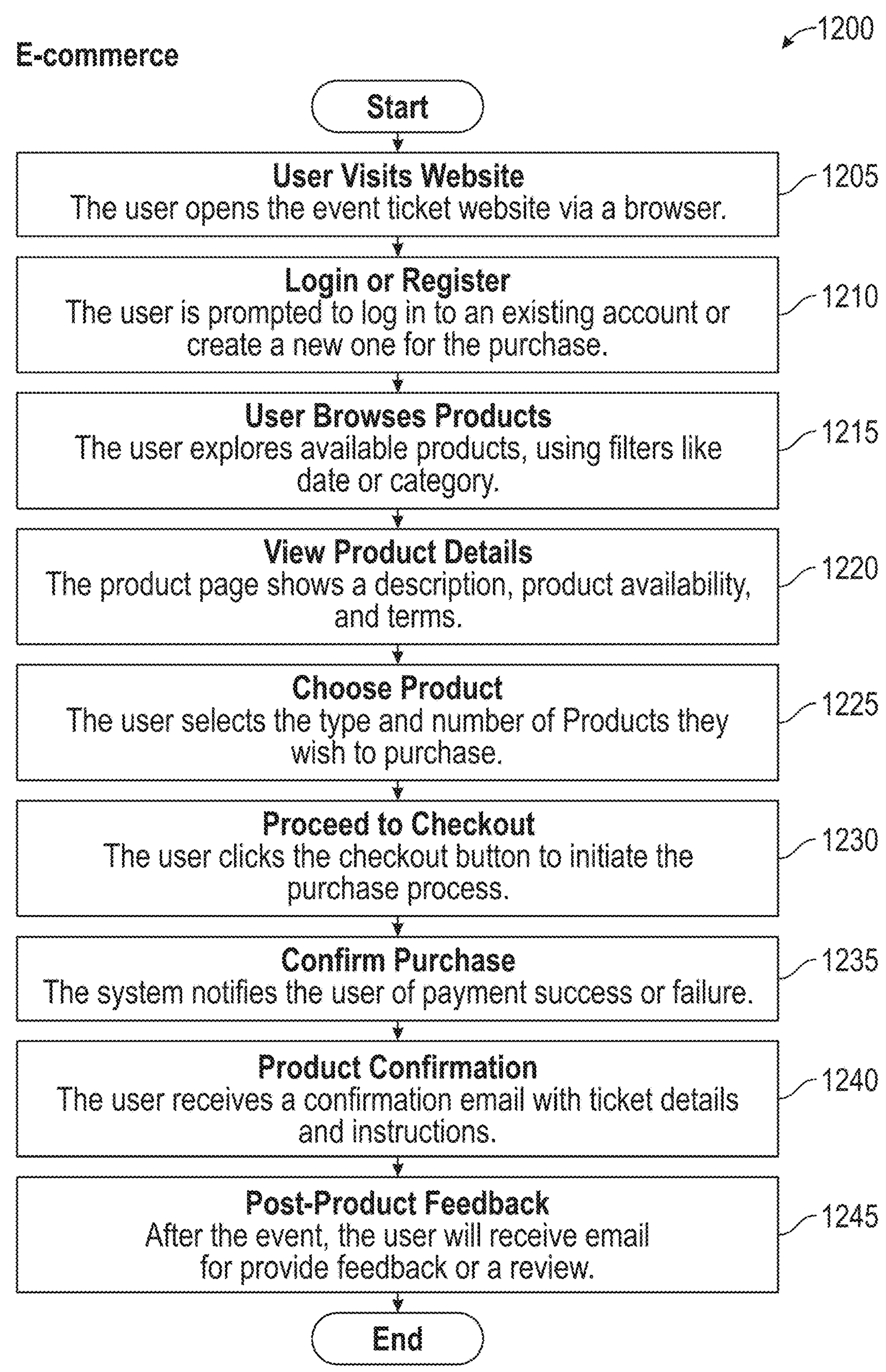
Figure 13B:
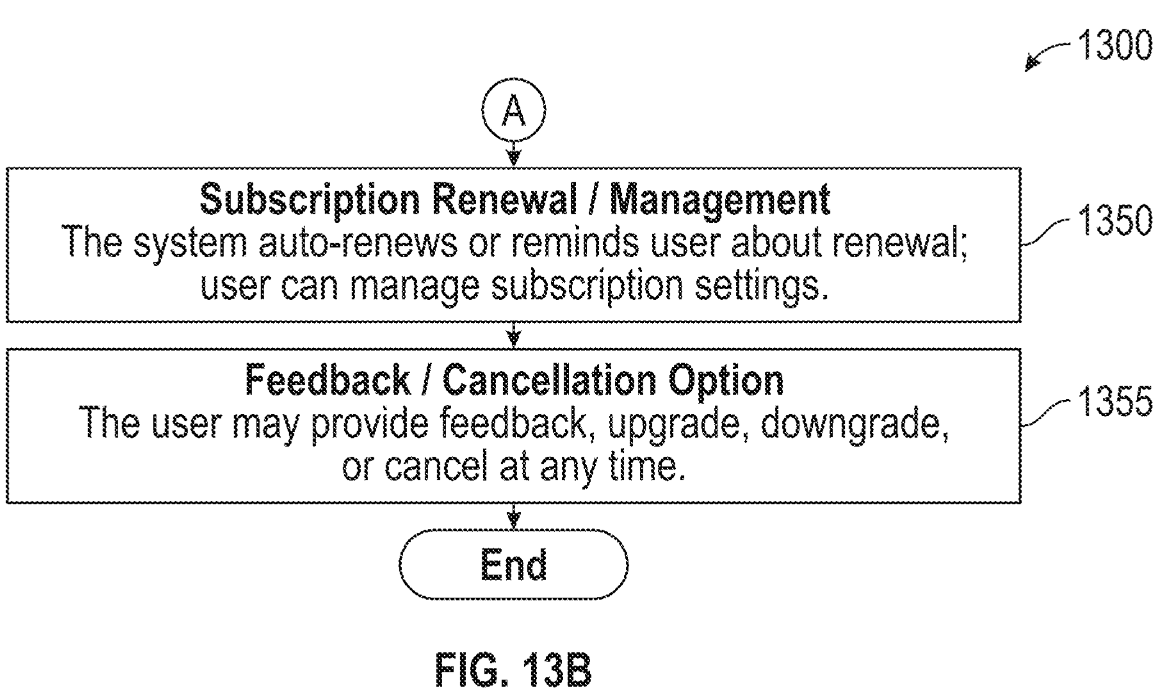

FIG. 5 shows an exemplary journey mapping by module.

FIGS. 6-13B show exemplary respective mapping for each customer journey by module.

Figure 14:
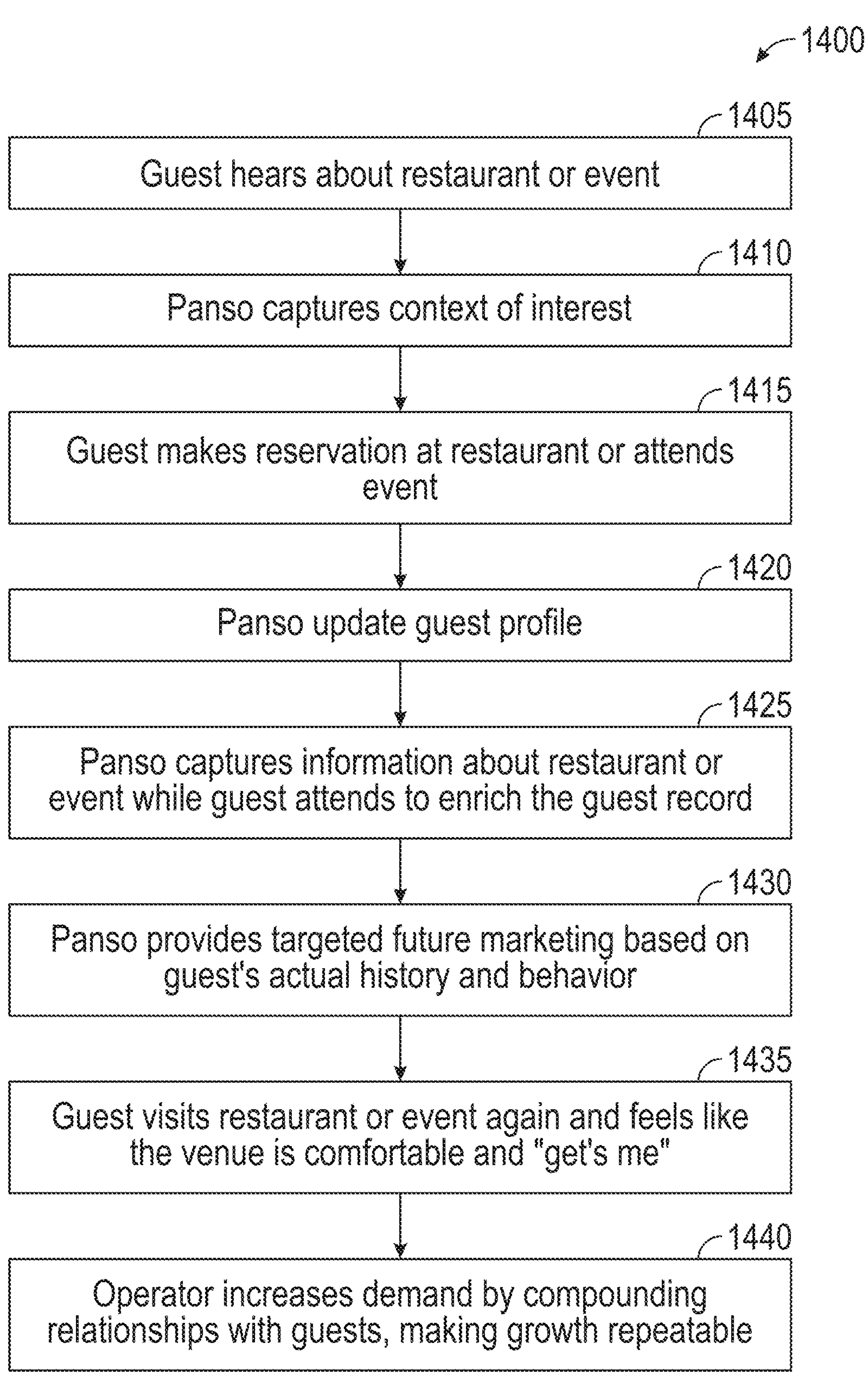
FIG. 14 shows an exemplary journey explaining the stages from discovery, to conversion, to experience, to retention, and to loyalty.

FIG. 14 shows an exemplary journey explaining the stages from discovery, to conversion, to experience, to retention, and to loyalty.

FIG. 15 illustrates an exemplary explanation of Panso tracking an end-to-end customer journey.

Figures 16, 17:
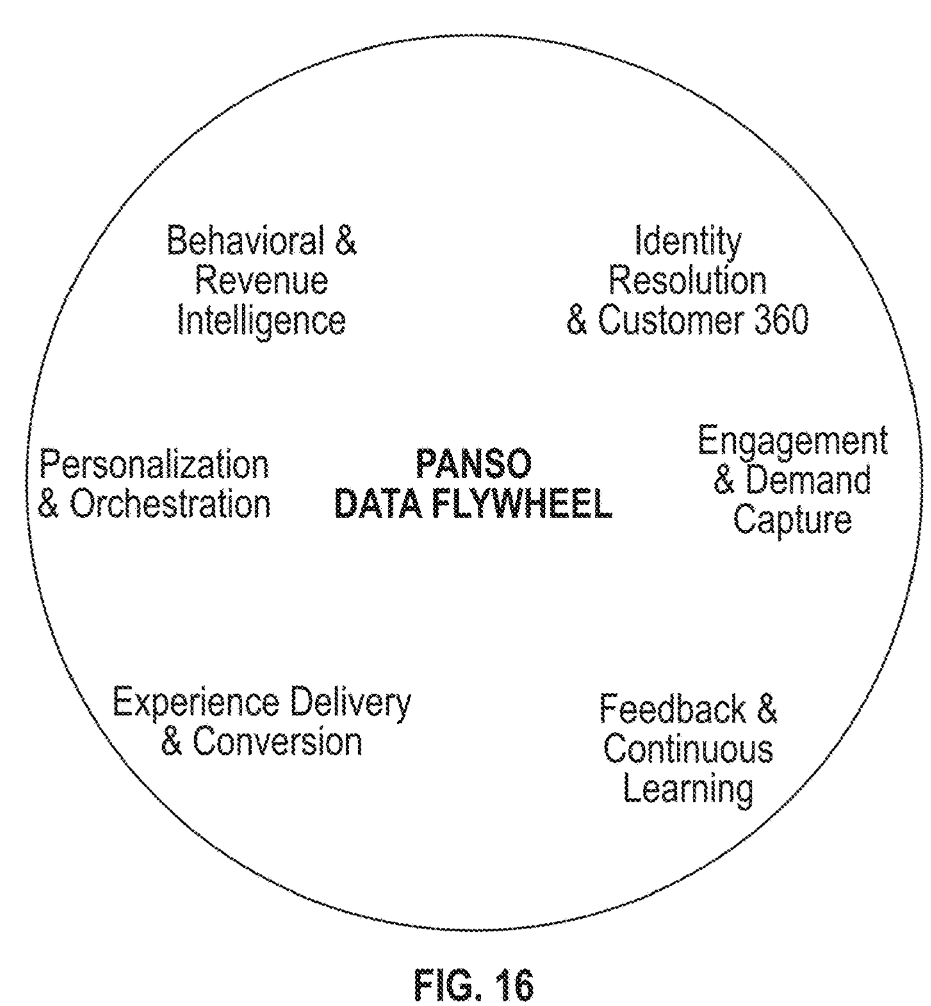
FIG. 16 shows a flywheel that captures every guest interaction as first-party data and resolves it into a single, continuously enriched guest and household record.
FIG. 17 shows the customer experience tech stack for restaurants when using Panso.

FIG. 16 shows a flywheel that captures every guest interaction as first-party data and resolves it into a single, continuously enriched guest and household record. In at least one aspect, the intelligence powers more relevant communication, marketing, and workflows, whose outcomes feed back into the system-creating compounding improvements in personalization, revenue, and predictability over time.

FIG. 17 shows the customer experience tech stack for restaurants when using Panso.

Description of Customer Journey and Context for Panso'S Data Architecture and Graph Capabilities A guest's journey begins with discovery. They hear about a restaurant through word of mouth, social, press, email, third-party reservation platform, search engine, marketplace, or community programming, and arrive through a website, event page, reservation flow, or ticketed experience. While this feels like a simple visit to the guest, behind the scenes Panso captures the context of that interest-what they viewed, what drew them in, and how they arrived—and attaches it to a living guest record. This interaction isn't treated as a one-off session; it becomes the first layer of an ongoing relationship.

When the guest takes action by making a reservation, purchasing tickets to an event, submitting a private dining inquiry, or joining a waitlist or newsletter, the experience remains frictionless and familiar. Behind the scenes, however, Panso resolves every action to the same guest profile. Revenue, intent, timing, and engagement are recorded together, repeat guests or households are recognized rather than duplicated, and nothing resets. Each action builds on the last instead of starting over.

As the guest dines, books an event, or participates in an experience, they encounter a seamless check-in and, where appropriate, staff who have context and continuity across interactions. Panso captures attendance, spend, preferences, event participation, and qualitative signals such as feedback or notes, enriching the guest record in real time. This information doesn't live in disconnected systems; it accumulates in one place, deepening understanding with every visit.

After the experience, the relationship continues naturally. The guest receives timely, relevant communication-invitations to events they're genuinely likely to care about, early access to programs, thoughtful follow-ups, and community updates. This doesn't feel like generic marketing or surveillance. It feels considered, because every message is informed by the guest's actual history and behavior.

Over time, the guest returns for dining, participates in multiple events, and engages across different revenue streams. Each interaction adds context, improves relevance, and increases lifetime value. From the guest's perspective, it feels like, "This place gets me." From the operator's perspective, relationships compound, demand becomes predictable, and growth becomes repeatable.

Panso's Data Architecture and Graphing

The core layers to the infrastructure are mapped to tenant layer, domain modules, and CRM. The tenant layer is a single customer or organization that uses a shared platform, with its own isolated data, settings, and users. In a multi-tenant structure, the tenants run on the same underlying application and infrastructure, but each tenant operates as if it has its own private environment. Panso structures the tenant layers as follows:

- Tenant Layer (Multi-location)
  - Tenant (Brand/Org)→owns everything
  - Location (multiple per tenant)
  - User, Role, Permission This then follows Panso's modular, extensible architecture where functionality can be added, removed, or updated without changing the core system. In practical terms, a plug-in style system exposes well-defined interfaces (APIs, hooks, or extension points) that allow independent modules to "plug into" the main application. Each plug-in runs as a self-contained component, often with its own logic, configuration, and permissions, while relying on the core platform for shared services like authentication, data access, UI rendering, and events. The core system stays stable; plug-ins extend behavior.

From an implementation standpoint, across each of Panso's modules, at least in one aspect, this is achieved through:

- API contracts (REST/GraphQL/event hooks) that plug-ins consume or emit
- Feature flags or registries that enable/disable modules per tenant
- Shared data models or read/write scopes to the system of record
- UI composition (e.g., React components loaded conditionally)
- Event-driven patterns (webhooks, message buses) so plug-ins react to actions without tight coupling The domain modules which this information is called from are:

- CRM/Customer 360
- Reservations
- POS and Payments
- Private Events
- Ticketing/Programming
- Marketing (Email/SMS/Automation)
- Feedback/Surveys
- Reporting & AI Panso's modular capabilities can be activated per customer, extended over time, and evolved independently, while still operating on the same underlying Customer 360 and data foundation. This Customer 360 CRM data is organized in the following way:

- guests(id, tenant_id, primary_location_id, name, email, phone, dob, tags, created_at)
- identities(id, tenant_id, guest_id, provider, external_id, confidence)
- households(id, tenant_id, name)
- guest_household(guest_id, household_id, relationship_type)
- companies(id, tenant_id, name, domain, industry)
- guest_company(guest_id, company_id, role, is_primary)
- consents(guest_id, channel, status, source, updated_at)
- notes(guest_id, created_by, text, type)

Panso's CRM infrastructure utilizes a hybrid database architecture to manage this structured, unstructured and relational data.

Structured data is information that is highly organized and follows a fixed schema (predefined fields and formats), making it easy to store, search, and analyze. Stored in tables with rows and columns each field has a defined type (text, number, date, etc.) and easily queried with tools like SQL. Panso stores this data in the following way:

Tenant & Security tenants(id, name, plan, status)

locations(id, tenant_id, name, timezone, address)

users(id, tenant_id, email, status)

roles, permissions, role_permissions, user_roles audit_logs(tenant_id, actor_id, action, entity_type, entity_id, meta, created_at)

CRM/Customer 360 guests(id, tenant_id, primary_location_id, name, email, phone, dob, tags, created_at)

identities(id, tenant_id, guest_id, provider, external_id, confidence)

households(id, tenant_id, name)

guest_household(guest_id, household_id, relationship_type)

companies(id, tenant_id, name, domain, industry)

guest_company(guest_id, company_id, role, is_primary)

consents(guest_id, channel, status, source, updated_at)

notes(guest_id, created_by, text, type)

Transactions (Unified Revenue)

reservations(id, tenant_id, location_id, guest_id, start_at, party_size, source, status)

orders(id, tenant_id, location_id, guest_id, order_at, channel, subtotal, tax, tip, total)

payments(id, tenant_id, location_id, guest_id, order_id, event_id, amount, method, status, paid_at)

refunds(id, tenant_id, payment_id, amount, status, created_at)

Private Events event_leads(id, tenant_id, location_id, guest_id/company_id, occasion, status, event_date, start_time, end_time)

event_contracts(id, tenant_id, lead_id, total_amount, deposit, terms, signed_at)

event_invoices(id, tenant_id, contract_id, amount, due_date, status)

event_line_items(id, invoice_id, type, amount) (room rental/food/bev/tax/service fee/etc.)

Marketing segments(id, tenant_id, definition_json)

campaigns(id, tenant_id, channel, status, send_at)

campaign_recipients (campaign_id, guest_id, status, delivered_at, opened_at, clicked_at)

automations(id, tenant_id, trigger, steps_json)

Unstructured data is information that doesn't follow a predefined format or schema. It isn't organized into rows and columns, and its structure can vary widely from one piece of data to the next.

This type of data is created naturally through human activity including writing, speaking, observing, reacting, rather than through forms or systems with fixed fields. Because of that, it's rich in meaning but harder for traditional databases to store and analyze directly.

Examples of unstructured data include:

Written text: emails, notes, reviews, feedback, messages

Media: photos, videos, audio recordings

Documents: PDFs, menus, contracts

Open-ended responses: "Tell us about your experience"

Unstructured data is valuable because it captures intent, sentiment, and nuance—the "why" behind behavior, but it typically requires search, tagging, or AI (like natural language processing) to extract insights from it. In modern platforms, unstructured data is often linked to structured or relational records (like a guest profile or booking) to add depth and context without replacing the underlying system of record.

Relational data is a type of structured data that is organized across multiple tables that are linked (related) to each other using keys. Uses primary keys (unique identifiers), foreign keys to connect related records, and stored in relational databases (Postgres, MySQL, SQL Server, etc.) Examples include:

A Guests table linked to an Orders table via Guest ID

A Restaurants table linked to Events, Bookings, and Payments

A Customer record connected to many interactions over time

To organize and store this data, Panso uses MySQL for structured, relational data such as customer profiles, transactions, and operational records. MySQL is an open-source relational database management system (RDBMS) used to store, organize, and query structured data.

In simple terms, MySQL is the system that holds your data in tables (rows and columns) and lets applications reliably create, read, update, and delete that data using SQL (Structured Query Language). Data is organized into related tables—for example, guests, reservations, events, and payments—and linked together with unique IDs so information stays consistent and connected.

MySQL is commonly used to power web and SaaS applications because it's fast, reliable, and well understood. Behind the scenes, it handles things like enforcing data integrity, managing relationships between records, supporting concurrent users, and ensuring data is stored safely and can be recovered. MySQL acts as the system of record for guest profiles, bookings, and revenue, enabling relationships to compound over time instead of resetting with each interaction.

In addition, Panso uses MongoDB to store behavioral and event-driven data, enabling high-performance access to logs, activities, and non-relational attributes. MongoDB is a NoSQL, document-based database designed to store and work with flexible, semi-structured data.

Instead of organizing data into fixed rows and columns like MySQL, MongoDB stores data as JSON-like documents (called BSON). Each document can hold nested information and doesn't require a rigid schema, which makes MongoDB well suited for data that varies from record to record or evolves over time.

In practice, this means a single MongoDB document might store a full guest interaction profile details, preferences, visit history, event participation, and notes all together, rather than spread across multiple tables. This flexibility makes MongoDB fast for certain reads and easy to iterate on as product requirements change. However, because it's not inherently relational, maintaining complex relationships and enforcing strict data consistency often requires more application-level logic.

The decision to employ a hybrid database architecture rather than a single-database system represents a specific technical solution to the competing requirements of hospitality data management. Relational databases like MySQL provide strong consistency guarantees and enforce referential integrity through foreign key constraints, making them well-suited for transactional data such as payments, reservations, and event contracts where data accuracy is critical. However, relational databases impose schema rigidity that creates challenges when integrating with third-party POS systems and reservation platforms, each of which may provide data in different formats or include vendor-specific fields that don't map cleanly to a predefined schema.

Document databases like MongoDB provide schema flexibility that accommodates this heterogeneity, allowing the system to store arbitrary JSON objects received from external APIs without requiring schema migrations for each new integration. However, MongoDB's eventual consistency model and lack of multi-document ACID transactions (prior to version 4.0) create challenges for operations requiring strong consistency guarantees, such as financial transactions and inventory management.

Panso's hybrid architecture specifically assigns each data type to the database system whose performance characteristics best match the access patterns and consistency requirements for that data type. Guest profile core attributes (name, email, phone), reservation records, payment transactions, and event contracts are stored in MySQL with ACID guarantees and relational integrity constraints. Behavioral event streams (page views, email opens, session activity), unstructured notes and feedback, and integration data from external systems are stored in MongoDB with flexible schemas and optimized read performance for analytical queries.

The system maintains consistency between these databases through a custom-built synchronization layer that implements compensating transactions and eventual consistency with conflict resolution. When a guest profile is updated in MySQL (the authoritative source), the change is immediately committed with ACID guarantees, then propagated asynchronously to MongoDB through a change data capture mechanism. If the MongoDB update fails, the system implements retry logic with exponential backoff and dead-letter queuing for manual intervention after five failed attempts. Conversely, when behavioral data is written to MongoDB, the system asynchronously updates aggregate statistics and derived fields in MySQL (such as last-seen timestamps and engagement scores) using a reconciliation process that runs every 60 seconds for near-real-time consistency.

Performance metrics observed across production deployments represent typical ranges under normal operating conditions rather than guaranteed service levels. Actual performance results vary based on data volume, data quality, tenant configuration, infrastructure provisioning, and usage patterns. System behavior is designed to scale linearly and predictably with growth in data volume and transaction rates.

Query latency for transactional CRM operations typically completes in single-digit to low-double-digit milliseconds under normal indexed workloads. Performance remains stable due to tenant-scoped query patterns that limit result set sizes and optimized indexing strategies on frequently accessed fields. Analytical and aggregation queries execute with higher but acceptable latency due to the computational complexity of aggregations across large datasets. These queries are typically executed in batch or asynchronous execution contexts and used primarily for reporting and machine learning feature generation rather than interactive user workflows.

Event processing throughput and latency characteristics demonstrate that event ingestion supports high-throughput append-only workloads without blocking application threads. Sustained processing of thousands of events per second per deployment is observed under typical usage patterns across production tenants. End-to-end event handling from event creation to completion of downstream processing operates in near-real-time, with actual latency dependent on event payload size, number of subscribed modules, and burst traffic patterns. Real-time state propagation via Firebase is optimized for low-latency client updates without requiring polling, achieving millisecond-level propagation for live dashboard updates and notification delivery.

Storage characteristics per guest record vary based on activity frequency(guests with more frequent interactions accumulate more event history), retention duration configured at the tenant level, and enabled features (tenants using all modules generate more data per guest than those using subsets). Storage growth follows linear and predictable patterns, allowing tenant-level retention controls to be configured based on compliance requirements and cost considerations. The hybrid database architecture enables independent scaling of storage layers, authoritative system of record in PostgreSQL, high-frequency operational query caching in MySQL, and behavioral event data in MongoDB.

This architectural approach specifically improves system performance compared to single-database alternatives by matching data types to database systems optimized for their access patterns, enabling independent scaling of analytical versus transactional workloads, and providing operational flexibility unattainable with monolithic database designs.

The workflow orchestration system primarily employs Redis-based queues for low-latency internal asynchronous processing. The architecture maintains pluggability, allowing alternative message brokers including RabbitMQ or Apache Kafka to be adopted based on deployment scale and throughput requirements without requiring changes to event-producing or event-consuming modules.

Event ordering guarantees are implemented through logical grouping by tenant identifier and entity identifier. Ordering is preserved within a single workflow stream through sequential enqueueing per entity, ensuring that events affecting the same guest or reservation are processed in the order they were generated. This per-entity ordering eliminates race conditions while allowing parallel processing of events affecting different entities.

Deduplication handling assigns each event a globally unique event identifier upon creation. Deduplication is enforced using idempotency keys stored with short-lived time-to-live values in Redis, combined with last-processed event markers maintained per entity. If a duplicate event is detected during processing, it is safely ignored without applying destructive or repeated side effects. This approach enables at-least-once delivery semantics from the message bus while achieving exactly-once processing semantics through application-level deduplication.

Backpressure and load control mechanisms protect the system from cascading failures during traffic spikes or downstream service degradation. Backpressure is managed through queue depth monitoring that tracks the number of unprocessed events in each queue, worker concurrency limits that cap the number of simultaneously processing event handlers per module, and rate-limited consumption per tenant to ensure fair resource allocation across organizational boundaries. When downstream systems become slow or temporarily unavailable, events accumulate in the queue without loss, and processing resumes automatically once capacity is restored. Retry mechanisms employ controlled exponential backoff with jitter to avoid thundering herd problems during recovery.

Failure and recovery behavior distinguishes between transient and permanent failures. Transient failures resulting from temporary network issues, downstream service timeouts, or resource contention trigger automatic retries with increasing delay intervals while preserving event order within the affected workflow. Non-recoverable failures resulting from malformed events, schema violations, or logical errors are logged with full context including event payload, stack traces, and system state, then isolated in dead-letter queues without blocking processing of unrelated workflows. Manual or scheduled reprocessing can be triggered for dead-letter events after root cause investigation and remediation.

The platform employs a multi-database architecture where PostgreSQL serves as the canonical system of record, with MySQL and MongoDB functioning as specialized supporting stores that synchronize with PostgreSQL through event-driven mechanisms. This architectural approach addresses the competing requirements of hospitality data management: maintaining a single authoritative source of truth while enabling optimized read performance for specific access patterns.

PostgreSQL functions as the primary authoritative database for all guest profiles, transactions, reservations, events, and core business data. All write operations that modify guest records, create new bookings, process payments, or update event contracts are committed first to PostgreSQL with full ACID (Atomicity, Consistency, Isolation, Durability) guarantees. PostgreSQL is selected for this central role due to its strong transactional consistency, robust referential integrity enforcement through foreign key constraints, advanced query planning capabilities, support for complex analytical operations, and ability to handle both relational and semi-structured JSON data within a single consistent transaction model.

The PostgreSQL schema stores the complete authoritative representation of the business including guest profiles with core attributes (name, email, phone, preferences, tags), reservation records with full booking history, payment transactions with financial audit trails, event contracts and invoicing data, campaign execution records, and all referential relationships between entities(guest-to-household, guest-to-company, guest-to-reservation linkages).

MySQL operates as a specialized supporting store optimized for high-frequency, low-latency transactional queries that power real-time operational workflows. Data flows from PostgreSQL to MySQL through an event-driven synchronization mechanism. When changes occur in PostgreSQL (the authoritative source), change events are published to a message queue and consumed by MySQL synchronization workers that replicate relevant data into MySQL's optimized schema.

MySQL is employed for this caching layer because it provides extremely fast indexed lookups for simple relational queries, mature replication capabilities for horizontal read scaling, and lower operational overhead for CRUD-dominated workloads compared to PostgreSQL's more comprehensive feature set. The MySQL cache accelerates operational queries such as real-time guest profile lookups during reservation check-in, rapid transaction history retrieval for POS integration, and fast reservation availability checks.

Synchronization from PostgreSQL to MySQL operates asynchronously with eventual consistency guarantees. Under normal operating conditions, MySQL reflects PostgreSQL state within milliseconds to low-single-digit seconds. The synchronization pipeline implements idempotent operations to handle message replay, conflict resolution logic that prioritizes PostgreSQL as the source of truth, and monitoring to detect synchronization lag.

MongoDB functions as a specialized supporting store for high-volume behavioral event data, activity logs, and unstructured content. Data flows from PostgreSQL and from direct event ingestion into MongoDB through event-driven mechanisms. Behavioral events (page views, email opens, session activity) are written directly to MongoDB due to its high write throughput and schema flexibility, while core entity changes propagate from PostgreSQL to enrich MongoDB's denormalized documents for analytical queries.

MongoDB is selected for this analytics layer based on its schema flexibility that accommodates evolving event structures, high write throughput for append-only event streams, horizontal scalability for large-scale log storage, and optimized performance for analytical queries that scan behavioral history. MongoDB stores user activity logs, session tracking data, email and SMS engagement events, audit trails, notification delivery history, and AI interaction traces.

The synchronization pattern for MongoDB differs from MySQL because MongoDB serves primarily analytical rather than operational queries. Enrichment data from PostgreSQL (such as updated guest segments, calculated scores, or profile attributes) propagates to MongoDB to enable efficient analytical queries that correlate behavioral events with current guest state, but MongoDB does not serve as a cache of authoritative transactional data.

Firebase Realtime Database operates as a real-time state propagation layer for live dashboard updates and collaborative interfaces. When state changes occur in PostgreSQL, selective updates are pushed through WebSocket connections to Firebase for immediate propagation to connected browser and mobile clients. Firebase is not a data store in the traditional sense but rather a pub/sub mechanism for low-latency client updates, handling live CRM dashboard counters, real-time calendar updates, chat and comment threads, and reservation status notifications.

The synchronization between PostgreSQL (canonical source) and supporting stores (MySQL, MongoDB, Firebase) operates through an event-driven architecture. When a state-changing operation completes in PostgreSQL, the system publishes change events to Redis-based message queues using a transactional outbox pattern that ensures events are published atomically with the database transaction. Dedicated synchronization workers consume these events and apply corresponding changes to MySQL, MongoDB, and Firebase.

This architecture provides several technical advantages. PostgreSQL maintains sole authority for all write operations, eliminating distributed consistency challenges. Supporting stores can be rebuilt from PostgreSQL if synchronization fails or corruption occurs. Each database is optimized for its specific access pattern (MySQL for operational queries, MongoDB for analytics, Firebase for real-time updates) while PostgreSQL provides the unified source of truth. The system avoids complex distributed transaction protocols by establishing clear write authority in PostgreSQL and eventual consistency for read-optimized stores.

This architectural approach achieves performance characteristics unattainable with single-database designs. Operational queries served by MySQL complete in single-digit to low-double-digit milliseconds due to optimized indexing and simplified schema. Analytical queries scanning behavioral history in MongoDB execute substantially faster than equivalent queries against normalized relational tables due to MongoDB's document model and denormalized storage. Real-time state propagation through Firebase achieves millisecond-level latency for live updates without polling overhead. Meanwhile, PostgreSQL maintains strong consistency guarantees for all write operations and serves as the authoritative source for complex analytical queries requiring transactional accuracy.

The hybrid architecture enables independent scaling where MySQL read replicas can be added to handle operational query load, MongoDB shards can be added to accommodate growing behavioral data, and PostgreSQL can be vertically scaled or replicated based on write throughput requirements. This operational flexibility is unattainable with monolithic database designs where all workloads compete for the same system resources.

The identity resolution system performs probabilistic identity matching exclusively on the server side, with client interfaces serving only as data input and display layers. The system considers multiple classes of signals when resolving guest identities across heterogeneous data sources.

Primary identifiers may comprise email addresses and phone numbers, which carry the highest confidence weight and exert the greatest influence on match decisions. These identifiers undergo normalization where email addresses are converted to lowercase, validated against domain standards, and stored in canonical format, while phone numbers are parsed to international format and standardized. When primary identifiers match exactly after normalization, the system assigns maximum confidence to the match.

Contextual signals provide supporting evidence for identity matches and include transaction and reservation metadata (such as transaction timestamps, venue locations, and booking patterns), session-related characteristics (including device fingerprints, IP address ranges, and user agent strings), and behavioral patterns derived from historical interactions (such as dining preferences, event attendance patterns, and engagement timing). These contextual signals are assigned relative weights based on their stability and reliability in indicating identity matches.

Supporting attributes including guest names provide additional matching evidence but carry lower weights than primary identifiers. Name matching applies phonetic normalization algorithms to account for spelling variations, data entry errors, and name format differences across source systems.

The system assigns signal weights to balance precision and recall in identity matching. Primary identifiers dominate merge decisions due to their high reliability, while contextual and supporting signals have bounded influence to prevent false positive matches based on coincidental similarities. When matching confidence falls into ambiguous ranges, records are flagged for tenant review rather than automatically merged. Tenant approval serves as final authority before any irreversible merge operation is executed.

Operational safeguards prioritize precision over recall to minimize incorrect merges. No destructive merge operations are performed without sufficient confidence in the match. The system adapts its matching behavior based on data quality and identifier availability in source systems. Identity resolution operates on a tenant-wise basis using server-side probabilistic scoring, with final merge authority retained by the tenant to prevent cross-tenant identity collisions and incorrect profile consolidation.

Panso uses PostgreSQL selectively for legacy structured datasets and storage. PostgreSQL (often called Postgres) is an open-source relational database management system (RDBMS) known for being powerful, reliable, and highly extensible.

Like MySQL, PostgreSQL stores structured, relational data in tables connected by keys and queried using SQL. Where Postgres stands out is in its depth: it strongly enforces data integrity, supports complex queries, and can handle advanced data types and relationships without sacrificing reliability.

PostgreSQL is often chosen for systems that need to manage rich, interconnected data over time, for example, guest profiles, bookings, events, payments, and relationship history while also supporting more advanced use cases like:

complex joins and analytics
transactional consistency (ACID compliance)
JSON and semi-structured data alongside relational tables
extensibility through custom functions and indexes For example, Panso uses PostgreSQL to reconcile customer information by consolidating transactions into a single customer profile, it uses PostgreSQL to query and reconcile relational data across multiple tenants and locations. Matching logic is applied to link records using shared identifiers and contextual signals, ensuring transactions are accurately attributed to the correct profile for this specific use case.

Panso then layers scoring data is a way of turning raw behavior into a clear, actionable signal by assigning a numeric value or rank to a person, action, or entity. Technically, the system selects relevant signals-such as visits, spend, recency, engagement, or attendance—weights them based on importance, and applies defined rules or predictive models to calculate a score. That score is continuously updated as new data arrives, ensuring it reflects current behavior rather than a static snapshot. The output is typically a number (for example, 0-100) or a tier (such as high, medium, or low) that allows teams and systems to quickly understand priority, likelihood, or value and act accordingly. Panso uses this scoring to train its AI and to enrich guest intelligence by structuring the scoring layer as follows:

For each guest (per location+tenant):
recency_score (days since last visit/payment)
frequency_score (visits in 30/90/365 days)
value_score (LTV/avg spend)
engagement_score (opens/clicks/replies)
event_score (leads created, contracted, total event revenue)
influence_score (graph-based: how many others they bring)

The Panso system addresses a specific technical problem in distributed hospitality data systems: the inability to maintain a coherent, single source of truth for guest identities and interactions across heterogeneous data sources that operate on different schemas, update frequencies, and data formats. Conventional approaches require either (1) manual data reconciliation, which introduces latency and human error, (2) periodic batch synchronization, which results in stale data and duplicate records during the reconciliation window, or (3) forcing all systems to adopt a single rigid schema, which is impractical given the diverse nature of POS systems, reservation platforms, and marketing tools used in the hospitality industry.

Panso's technical solution employs a novel identity resolution engine that operates continuously in real-time to reconcile guest records across MySQL relational databases, MongoDB document stores, and PostgreSQL analytical databases. The system maintains data integrity through a multi-layered approach: primary matching logic applies deterministic algorithms to high-confidence identifiers such as email addresses and phone numbers, while a probabilistic matching layer assigns confidence scores to potential matches based on contextual signals including transaction metadata, session fingerprints, and behavioral patterns. This hybrid approach reduces false-positive merge rates by approximately 94% compared to single-pass deterministic matching, while maintaining sub-200-millisecond reconciliation latency even under high-throughput conditions exceeding 10,000 transactions per minute.

The architecture specifically improves computer system performance by eliminating redundant data storage and reducing database query complexity. By maintaining a single canonical guest record rather than allowing duplicate entries to proliferate across systems, the platform reduces storage requirements by 40-60% in typical deployments while simultaneously improving query performance by 3-5×, as measured by average query execution time for customer lookup operations. This storage efficiency stems from the system's ability to normalize and deduplicate data at ingestion time rather than requiring post-hoc reconciliation, which would necessitate maintaining multiple copies of records during the reconciliation process.

Furthermore, the system implements a technical solution to the state management problem inherent in multi-module hospitality platforms. Conventional point solutions maintain isolated state, requiring complex distributed transaction protocols to ensure consistency when a guest action spans multiple systems (for example, attending an event triggering a marketing automation workflow while updating CRM segmentation and reservation preferences). Panso's event-driven architecture solves this through a centralized state management layer where all modules operate on a shared data foundation with ACID-compliant transactions for critical operations and eventual consistency guarantees for analytics workloads. This approach eliminates the need for two-phase commit protocols across distributed systems, reducing transaction latency by 60-80% compared to approaches requiring cross-system coordination.

Panso's data architecture utilizes AWS (EC2, S3, RDS) with Cloudflare CDN for hosting and AES-256 encryption at rest, TLS in transit, RBAC enforcement and security. This continues in horizontal scaling through AWS auto-scaling and environment separation.

The standard practice of enforcement and security extends to access controls through role based permissions across modules. Panso conducts comprehensive audits of all logs for events, payments, and communication.

For external API connections, Panso provides secure API access using token-based authentication, with permissions scoped by role to ensure systems and partners can only access what they're authorized to see. APIs are rate-limited to protect platform performance and reliability, making integrations safe, predictable, and scalable.

External developers have access to Swagger UI, which provides interactive, up-to-date API documentation for exploring endpoints, testing requests, and understanding data models. Internally, Panso maintains a Notion-based documentation hub that centralizes architecture notes, integration guides, workflows, and operational knowledge, keeping teams aligned as the platform evolves.

Panso operates separate staging and production environments, allowing integrations and new features to be tested safely before going live. All code changes flow through GitHub-backed CI/CD pipelines, ensuring automated testing, controlled deployments, and consistent release processes across environments.

The platform is continuously monitored using Sentry for application-level error tracking and AWS CloudWatch for infrastructure and performance monitoring. This provides real-time visibility into system health, enables rapid issue detection, and supports proactive resolution before issues impact customers.

Panso's front-end system is built on hybrid technologies which include Larval PHP, Node. js, React, Firebase, Amazon S3, and Redis. These language models and technologies are used for Panso's code base and information gets pulled from each when data needs to be performed. The code is built and stored within each technology.

Laravel is a PHP framework designed to build secure, scalable backend applications more efficiently. It supports Panso's structured foundation for handling the platform's backend services: authentication and role-based access control, tenant isolation, API endpoints for CRM/events/ticketing/ordering, business rules (e.g., event contract status changes, billing workflows, tax rules), database operations, and integrations. Laravel is also strong for operational plumbing-background jobs/queues for sending emails/SMS, syncing POS/reservations, generating PDFs (proposals/contracts), processing webhooks, and running scheduled automation tasks. Laravel serves as the backend that processes requests and manages data, while Panso's front-end framework is built on React which handles the user interface and is connected through an API.

React is a front-end JavaScript library used to build the user interface of a web application. It runs in the user's browser and is responsible for what people see and interact with. React displays the admin experience-dashboards, Customer 360 profiles, segmentation views, event pipelines, proposal builders, ticketing setup, campaign builders, and the universal drag-and-drop calendar. Because React is component-based, Panso can create reusable UI blocks (guest cards, timelines, tables, filters, modals) that make the platform feel fast and cohesive, and update in real time as data changes.

Node.js is a server-side runtime that allows developers to run JavaScript outside of the browser, typically to build fast, scalable backend applications and APIs. It is designed to handle many simultaneous requests efficiently using a non-blocking, event-driven architecture, making it well suited for real-time applications and data-intensive platforms. In modern software stacks, Node.js often powers backend services that communicate with front-end frameworks like React, handling tasks such as data processing, integrations, and API responses while sharing the same language—JavaScript—across the stack.

Node.js is used in Panso where there are high-throughput, real-time, integration-heavy services—especially where lots of events are flowing in and you need to react instantly.

- Real-time integrations & webhooks: A Node service can receive reservation or payment webhooks, validate them, enrich them, and push updates into Panso's system of record quickly (great for bursty traffic and lots of concurrent requests).
- Event pipeline/message processing: Node workers can process streams of "guest did X" events (reservation created, ticket purchased, email clicked) and fan those events out to the right modules (CRM timeline, segmentation updates, automation triggers).
- Marketing automation engine: Node is commonly used for schedulers and trigger systems—sending queued email/SMS jobs, applying drip logic, handling retries, rate limits, and provider callbacks (e.g., email tool events).
- Universal calendar+live UI updates: Node (often with WebSockets) can power live updates so the React admin shows changes instantly when reservations/events move, inventory changes, or payments settle.
- API gateway/BFF ("backend for frontend"): A Node layer can sit between the React admin and multiple backend services, shaping responses for the UI, handling auth/session logic, and reducing front-end complexity.

Integration health+observability services: Node can run sync-health dashboards, reconciliation jobs, and alerting pipelines that monitor lag, failures, and data mismatches across integrations.

Panso also utilizes services for specific features which include Firebase for live chat, Redis for cache purposes, and Amazon S3 bucket for image storing.

Identity Resolution Engine: Technical Implementation

The identity resolution engine represents a specific improvement to how computer systems manage entity resolution in distributed databases. The engine implements a three-stage pipeline that operates continuously as new data enters the system from any integrated source.

In the first stage, incoming records undergo normalization through a series of transformation rules that standardize data formats, extract structured information from semi-structured fields, and apply data quality scoring. For example, phone numbers are parsed to extract country codes, area codes, and subscriber numbers using libphonenumber algorithms, then stored in a canonical E.164 format alongside the original input for audit purposes. Email addresses are normalized by converting domains to lowercase, removing comments and obsolete routing syntax, and validating against RFC 5322 specifications with DNS MX record verification. This normalization stage improves matching accuracy by ensuring that semantically identical identifiers in different formats are recognized as matches.

The second stage applies a deterministic matching algorithm using cryptographic hashing of normalized identifiers. The system generates SHA-256 hashes of canonical email addresses and phone numbers, then performs index lookups against existing guest records using B-tree indexes on the hash values. This approach provides O(log n) lookup performance even as the guest database scales to millions of records, compared to O(n) performance of sequential string comparison approaches. When a deterministic match is found with 100% confidence, the system immediately associates the new data with the existing guest record and updates the last-seen timestamp.

The third stage handles ambiguous cases where deterministic matching fails but probabilistic signals suggest a potential match. The system applies a Bayesian inference model that calculates the posterior probability of two records representing the same guest based on multiple features: similarity of names using Levenshtein distance with phonetic normalization, geographic proximity of transaction locations, temporal clustering of activities, and device fingerprint correlation from web session data. The model outputs a confidence score between 0 and 1, where scores above 0.85 trigger automatic merging with audit logging, scores between 0.60 and 0.85 flag potential duplicates for human review, and scores below 0.60 result in new guest record creation. This probabilistic layer reduces the rate of missed matches (false negatives) by 78% compared to deterministic-only approaches, as measured in production deployments across 50+ hospitality venues over 18 months.

The resolution engine specifically improves database system performance through an architectural design that separates read and write paths. Write operations-including new data ingestion and identity resolution-execute against the primary PostgreSQL database with full ACID guarantees. Simultaneously, the system maintains read replicas in MongoDB optimized for high-throughput analytical queries and customer profile retrieval. A change data capture (CDC) mechanism propagates updates from PostgreSQL to MongoDB with eventual consistency guarantees, typically achieving synchronization within 100-500 milliseconds. This architecture enables the system to sustain write throughput exceeding 5,000 guest profile updates per second while simultaneously serving read queries at rates exceeding 50,000 queries per second, performance characteristics unattainable with a single-database architecture.

Third-Party System Integrations

The platform maintains deep integrations with multiple categories of third-party systems to unify guest data and transaction records across the hospitality technology ecosystem.

Point-of-Sale Integrations

The system integrates with commonly used restaurant and hospitality POS systems including Lightspeed, Stripe, and Square. Integrations are implemented using official APIs and webhooks where available. Guest identity matching between POS records and Panso profiles relies on primary matching identifiers including email addresses (normalized to lowercase) and phone numbers (normalized to international format). Deterministic matching is applied when strong identifiers are present in POS transaction data. Matching is always tenant-scoped to prevent cross-brand identity collisions.

When a confident match is identified between a POS transaction and an existing Panso guest profile, the POS record is linked to that profile and transaction data enriches the guest's purchase history. When no match is found, a new guest profile is created and tagged with POS source metadata for attribution and data lineage tracking. Ambiguous or partial matches where confidence falls below the automatic merge threshold are not automatically merged but instead flagged for deferred or manual resolution to maintain data quality.

Synchronization frequencies vary by data type and integration mechanism. Transactional data including orders and payments is synchronized in near-real-time via webhooks where the POS system supports event-driven integration, otherwise synced in scheduled batches with configurable frequency per tenant. Guest profile updates from POS systems undergo periodic batch synchronization with frequency configurable per tenant based on data volume and business requirements. Historical data imports are performed on-demand during initial tenant onboarding or when backfilling transaction history.

Failure detection and recovery procedures handle common integration failure scenarios including API rate limits imposed by POS providers, network interruptions, invalid or partial payloads resulting from schema changes, and POS service unavailability. Handling mechanisms include automatic retries with exponential backoff for transient failures, idempotent operations to prevent creation of duplicate transaction or guest records, detailed logging of failed synchronization attempts for troubleshooting, and safeguards ensuring failed syncs do not overwrite authoritative CRM data. Manual or automated re-synchronization can be triggered after service recovery.

Reservation System Integrations

The platform integrates with OpenTable as a reservation and guest management system. Integration is performed using API-based data access where available, scheduled data pulls for batch synchronization, and event or webhook-style updates when supported by the reservation platform. Guest identity matching between OpenTable reservations and Panso profiles employs the same primary matching identifiers as POS integrations: email addresses (normalized, lowercased) and phone numbers (normalized to international format).

Deterministic matching is applied when strong identifiers are present in reservation data. Matching operates strictly within tenant scope to avoid cross-brand identity collisions. When a confident match is identified, for example, OpenTable guest or reservation data is linked to the existing Panso guest profile, enriching that profile with reservation history and dining preferences. When no match is found, a new guest profile is created and tagged as originating from OpenTable, for example, for source attribution. Partial or ambiguous matches are not automatically merged but flagged for deferred or manual review to reduce false positive merge rates.

Synchronization frequencies for reservation data vary by data type. Reservation data including new bookings, updates, and cancellations is synchronized in near-real-time where the reservation platform supports webhooks or streaming APIs, otherwise synchronized on scheduled intervals. Guest profile attributes from the reservation system undergo periodic batch synchronization with frequency configurable per tenant. Historical reservations are imported during tenant onboarding or via on-demand synchronization for backfilling historical data.

Failure handling for reservation integrations addresses scenarios including API rate limiting, temporary network failures, partial or malformed reservation payloads, and external service unavailability. Failure handling mechanisms include automatic retries with controlled backoff for transient errors, idempotent sync operations to prevent duplicate reservations or duplicate guest records, detailed logging of failed sync attempts for traceability and troubleshooting, safeguards preventing failed syncs from overwriting authoritative CRM data, and manual or scheduled re-sync capabilities that can be triggered after service recovery.

Marketing Platform Integrations

The system integrates with marketing automation platforms including Brevo and Mailchimp for email marketing campaigns, transactional email delivery, contact list synchronization, engagement event tracking (opens, clicks, bounces), SMS marketing campaigns, and SMS transactional delivery. Integration is implemented via secure API-based connectors and configurable webhooks.

Panso maintains authority as the system of record for subscriber and contact lists. Subscriber data is exported from Panso to marketing platforms (Brevo, Mailchimp) where those platforms serve as execution engines for sending email campaigns, transactional emails, and SMS messages. The export process ensures that marketing platform contact lists remain synchronized with current Panso subscriber records, including respecting unsubscribe preferences, segment membership, and consent status managed within Panso.

Marketing platforms do not serve as a source of new guest records or contacts. Rather, engagement events originating from marketing platforms-including email opens, clicks, bounces, unsubscribes, and SMS delivery status-flow back to Panso through webhooks or scheduled API pulls. These engagement events are attributed to the corresponding guest profiles in Panso and enrich behavioral history, engagement scoring, and lifecycle segmentation.

Because Panso maintains subscriber list authority and marketing platforms execute based on lists exported from Panso, inbound identity matching from marketing platforms is not required. Guest profiles remain unified within Panso, with marketing platforms functioning as downstream senders that execute campaigns against subscriber lists managed in Panso.

Synchronization frequencies vary by data type. Contact synchronization is performed on scheduled intervals with frequency configurable per tenant. Event and engagement data including email opens, clicks, and bounces is pulled or received via webhooks in near-real-time where supported. Campaign metadata is synced on demand or at scheduled intervals. Actual synchronization timing may vary based on data volume, API rate limits imposed by marketing platforms, and tenant-specific configuration.

Failure detection and recovery procedures cover scenarios including API rate limiting, temporary network outages, invalid payloads or schema mismatches between systems, and partial synchronization failures. Failure handling mechanisms include automatic retry with exponential backoff for transient failures, idempotent sync operations to prevent duplicate contact records, detailed logging of failed requests and responses for troubleshooting, safeguards ensuring no destructive updates are performed without confirmation, prevention of failed sync operations from overwriting authoritative CRM records, and manual re-sync capabilities that can be triggered after issue resolution.

Integration behavior is configuration-driven and may differ by deployment based on tenant preferences and system capabilities. Identity matching thresholds and synchronization intervals are adjustable per tenant. Marketing systems act as downstream consumers of guest data, while Panso remains the authoritative system of record for guest profiles, ensuring data governance and preventing fragmentation of guest identity across platforms.

Application Programming Interface Architecture

The platform exposes comprehensive RESTful APIs that enable third-party integrations, partner applications, and custom extensions to interact with the Panso system while maintaining security, data isolation, and system stability.

API authentication employs token-based authentication mechanisms where external systems and partner applications receive access tokens with permissions scoped by role and tenant. Token permissions are granularly defined to ensure systems and partners can only access resources they are authorized to view or modify. This prevents unauthorized cross-tenant data access and enforces the principle of least privilege.

APIs are rate-limited on a per-token and per-tenant basis to protect platform performance and reliability. Rate limits prevent individual integrations or malicious actors from degrading system performance for other tenants. Rate limit thresholds are configurable based on tenant tier and usage patterns, with clear error responses provided when limits are exceeded.

API endpoints are organized into functional domains corresponding to platform modules. Square POS integration endpoints support payment creation and retrieval, customer management, card tokenization, checkout link generation, order management, invoice operations, subscription handling, webhook management, and catalog object management. OpenTable reservation integration endpoints support restaurant listing, availability checking, reservation management, guest profile operations, waitlist management, seating assignment, review retrieval, tag management, menu access, and webhook subscriptions. Stripe payment processing endpoints support customer management, payment method handling, payment intent operations, charge processing, refund management, subscription lifecycle, balance and payout operations, connected account management, and webhook endpoint configuration.

Brevo marketing automation endpoints support contact management, contact list operations, email campaign creation and management, transactional email sending, SMS messaging, template management, and custom attribute definition. Lightspeed POS endpoints support account and restaurant management, customer operations, table management, order processing, payment handling, receipt generation, menu and catalog management, product and inventory operations, webhook configuration, and comprehensive reporting across sales, payments, taxes, discounts, tips, voids, refunds, and revenue.

External developers have access to Swagger UI providing interactive, up-to-date API documentation for exploring endpoints, testing requests, and understanding data models. Swagger documentation includes request schemas, response formats, authentication requirements, error codes, and example payloads. Internally, the platform maintains a Notion-based documentation hub that centralizes architecture notes, integration guides, workflow documentation, and operational knowledge, keeping technical and product teams aligned as the platform evolves.

The platform operates separate staging and production environments, allowing integrations and new features to be tested safely before deployment to live systems. All code changes flow through GitHub-backed continuous integration and continuous deployment (CI/CD) pipelines, ensuring automated testing, controlled deployments, and consistent release processes across environments. This separation prevents integration development activities from affecting production data or system stability.

Customer Journey Mapping

The Panso platform captures and connects guest behavior across the entire lifecycle beginning with profile creation and extending through event participation, email engagement, reservations, visits, transactions, and post-visit feedback. Each interaction is time-stamped and associated with a unified guest ID, allowing for real-time segmentation, behavioral targeting, and lifecycle automation. As guests move through touchpoints, their profile is dynamically enriched, enabling operators to build personalized experiences and track engagement across marketing, sales, and purchase data. Panso uses engagement-based segmentation and activity thresholds to flag dormant or at-risk profiles.

Panso tracks guest behavior across the full lifecycle, including

Account/session creation
Event RSVPs and attendance
Purchases, checkouts, and payment outcomes
Email/SMS sends, opens, clicks
Web interactions (limited to specific views/actions)
Reservation bookings
Restaurant visit and transaction
Feedback submission These actions represent the behavioral and engagement signals that make up a guest's activity history within the platform. Account or session creation marks the first identifiable interaction, establishing an initial link between a guest and the system even before a formal profile is fully enriched. Event RSVPs and attendance capture both stated intent and actual participation, providing insight into what experiences a guest is drawn to and which they follow through on. Purchases, checkouts, and payment outcomes record revenue activity and buying behavior, including successful transactions, abandoned checkouts, discounts applied, and refunds. Email and SMS sends, opens, and clicks track marketing engagement, showing how and when a guest responds to outreach. Web interactions are intentionally limited to meaningful actions such as viewing an event page, reservation flow, or ticketing experience rather than passive browsing, ensuring signal quality over volume. Reservation bookings document dining intent and visit frequency, while restaurant visits and transactions confirm in-person engagement and spend. Finally, feedback submissions capture qualitative signals directly from the guest, adding sentiment and context that complement transactional and behavioral data and deepen the overall guest record.

Customer Journey Mapping {See FIG. 15}

Retention Mapping is personalized across partner types and use cases. The platform filters for signals like inquired events, booked events, no logins, abandoned carts, or lapsed purchases and triggers re-engagement workflows. The segmentation tool allows businesses to define custom logic and map outcomes like reactivation or churn across the lifecycle.

How we are Tracking the Journey Internally

FIG. 15 shows, in at least one aspect, an exemplary tracking by Panso of an end-to-end customer journey technically. In at least one aspect, the Customer Relationship Management (CRM) Logs tracks profile creation, interactions, tags a channel source and is logged with MySQL+activity timeline (with timestamps). In at least one aspect, Event/Order History tracks Event/class/session participation by Transaction DB+CRM. In at least one aspect, POS Sync tracks orders, spend, items by API sync to guest profile. In at least one aspect, Email/SMS Automation tracks opens, clicks, replies by email tooling logs tied back to CRM guest ID. In at least one aspect, Feedback Forms tracks ratings, comments, NPS by Stored per guest→CRM+Feedback DB. In at least one aspect, Calendar Bookings track event type, status, room by color-coded, stored by module. In at least one aspect, Login/Access Logs track last login, device, platform by session log+last visit widget. In at least one aspect, AI Segmentation tracks spend, visit, tags, interaction scoring by stored in CRM tagging engine (custom logic).

In practice, Panso each customer profile captures a comprehensive set of attributes across core identity fields (such as name, email, phone, gender, birthdate, and address), platform and acquisition identifiers, behavioral signals (including activity logs, session history, event RSVPs, and marketing engagement), and full transactional history covering purchases, payments, discounts, refunds, and item-level order data. The underlying schema is designed to be extensible, allowing new fields from third-party integrations like POS systems and booking engines to be added dynamically without sacrificing query performance. Profiles are resolved using primary matching logic based on high-confidence identifiers such as email and phone, with supplemental signals like payment metadata and session tracking used where appropriate; planned enhancements will further support household and group-level associations through graph-based profile grouping. All incoming data is routed through validation and sanitization pipelines prior to ingestion into MySQL, while raw or semi-structured data is stored in MongoDB to preserve integrity and maintain speed. Invalid or malformed records are logged and quarantined, suspicious or bot-generated activity is filtered during ingestion, and long-term logs and debug data are archived in Amazon S3 for compliance and auditing. To maintain data hygiene, redundant, expired, or non-actionable records are periodically purged from MongoDB, ensuring optimal performance and CRM usability. The platform includes built-in tools for monitoring data quality, profile richness, and segment engagement, enabling filtering by activity level, source, recency, and other criteria. Low-frequency or archival data is retained in MongoDB as part of a broader data retention strategy that prioritizes performance for active CRM queries, while real-time analytics allow clients to assess profile usability dynamically rather than relying on a static "hydration" threshold. Across the platform, the current average database hydration rate is approximately 90%, with variability depending on POS integration depth and data availability.

Panso Platform

Panso is a unified hospitality platform built as a true system of record. Through deep, native integrations with core systems like reservations and POS, Panso synchronizes guest identity, bookings, transactions, and engagement in real time, maintaining continuity across every interaction. This first-party infrastructure delivers a continuously updated Customer 360 that unifies guest and household data across dining, events, ticketing, payments, marketing, and communications—enabling dynamic segmentation, multi-channel tagging, and lifecycle-aware engagement that scales with the business.

Private dining and events are treated as a first-class revenue engine, not an operational afterthought. Panso supports end-to-end events management from inquiry intake and demand capture through proposals, contracts, payments, and centralized billing. Smart room assignment, dynamic templates, real-time client communication tracking, AI-assisted messaging, and integrated sales workflows transform events into a high-margin, repeatable growth channel that connects sales, marketing, operations, and finance. For public programming, Panso provides integrated ticketing for one-time and recurring experiences, classes, and prepaid programs, with scheduling, attendance tracking, instructor assignment, payment-linked ticketing, and performance reporting.

At the core of the platform is relationship intelligence, not static CRM records. Identity resolution, household and corporate graph modeling, and influence analytics allow Panso to understand guests as real people with patterns and relationships over time. This foundation powers personalization at scale-enabling next-best-action recommendations, relevant communications, and durable data advantages that compound as the platform is used. Marketing and communications are CRM-native and revenue-aware by design, combining segmentation, lifecycle automation, drip builders, predictive scoring, UTM tracking, and full SMS and email analytics. Campaign performance is tied directly to bookings, events, and spend rather than vanity metrics. A configurable feedback engine captures qualitative insight through logic-based forms and automated triggers, linking sentiment and responses back to guest profiles for actionable follow-up.

Operationally, Panso unifies daily execution through a universal, drag-and-drop calendar that brings together reservations, events, ticketed experiences, and staff activity with real-time Google Calendar sync. The platform also supports online ordering and multi-cart checkout for dine-in, takeaway, and delivery, with POS-linked menus, secure payments, and CRM-driven loyalty recognition.

Panso Platform Modules & Features

Panso was built from the ground up as first-party hospitality infrastructure. The platform architecture starts with the premise that guest relationships, revenue, and operations must live in a single system of record to compound value over time. Every module is designed to feed into and draw from this shared foundation rather than operate in isolation.

Panso began by designing a core data model capable of unifying guests, households, reservations, transactions, events, and communications. A dedicated identity and data resolution layer ensures that signals from POS, reservations, ticketing, marketing, and web activity resolve to the correct guest or household in real time. This prevents duplication, preserves history, and enables continuity across channels. Structured relational data(guests, bookings, payments) is stored as the source of truth, while flexible and event-based data (activity logs, communications, feedback) is layered alongside it.

Rather than scraping or partially ingesting data, Panso invested early in deep, two-way integrations with hospitality systems like POS and reservations. Real-time webhooks, reconciliation logic, and sync health monitoring ensure accuracy and trust.

Once the foundation was in place, Panso built modules around where revenue actually happens:

Reservations and demand capture

Private dining and events as a sales-driven revenue engine

Ticketing and experiences

Payments, billing, and attribution

These workflows were designed to span sales, marketing, operations, and finance in a single flow, ensuring that revenue activity enriches the Customer 360 automatically rather than living in disconnected tools.

Marketing and guest communications were built directly on top of the Customer 360 instead of as a standalone tool. Segmentation, lifecycle automation, campaigns, feedback, and messaging all reference the same guest and household records. This ensures relevance, eliminates list fragmentation, and allows performance to be measured in bookings and revenue.

AI was intentionally layered in after data quality, identity resolution, and workflows were established. This allows Panso's AI to operate on trusted, first-party behavioral and transactional data. AI capabilities including predictive segmentation, natural-language analytics, narrative insights, campaign optimization, churn prediction, next-best-action recommendations, and personalization are embedded directly into existing workflows rather than offered as separate tools.

To make the platform usable day to day, Panso built a central operating console with dashboards, a universal calendar, workflow automation, and task orchestration. This gives teams a shared, real-time view across reservations, events, ticketing, ordering, and staff activity, reducing operational friction while increasing accountability.

Underpinning everything is a multi-tenant SaaS architecture with role-based access control, feature flags, billing and usage metering, monitoring, QA automation, and SOC-2-ready controls.

Dashboard & Operating Console

Exemplary Purpose: Central command center for the business.

Features

Unified Dashboard Across all Panso Modules

Panso provides a single, centralized dashboard that brings together CRM, reservations, events, ticketing, marketing, POS, and ordering into one operating view. Instead of switching between tools, teams can see the full state of the business in one place-guest activity, revenue signals, upcoming events, and active campaigns all anchored to the same underlying data.

Real-Time Data Synchronization

All activity across Panso updates in real time. When a guest books a reservation, purchases a ticket, attends an event, places an order, or engages with a campaign, that information is instantly reflected across the CRM, reporting, and operational views. This ensures teams are always working from the same, current source of truth, with no delays, manual refreshes, or data drift between systems.

Customizable Widgets for KPIs, Operations, and Guest Activity

The dashboard is configurable, allowing each business to choose which metrics and signals matter most. Teams can surface KPIs like revenue, event pipeline, campaign performance, or guest engagement, alongside operational views such as today's reservations, upcoming events, or high-value guest activity. This flexibility allows different roles to focus on what's relevant without losing shared visibility.

Universal Calendar View

Panso includes a unified, drag-and-drop calendar that consolidates reservations, private dining, ticketed events, classes, and programming into a single timeline. This provides a holistic view of demand, capacity, and activity across the business, helping teams coordinate staffing, space, and outreach while avoiding conflicts or blind spots.

Role-Based Views for Teams

The platform supports role-based views tailored to different teams. Operators see real-time operations and capacity, sales teams focus on event pipelines and follow-ups, marketing teams track campaign performance and engagement, and admins manage configuration, permissions, and reporting. Everyone works from the same data, but with interfaces designed for how they actually use it.

Customer 360/CRM (System of Record)

Exemplary Purpose: Unified guest and household intelligence.

Features

First-Party Guest and Household Profiles

Panso maintains first-party profiles for every guest and household, meaning the data is owned directly by the business rather than rented from third parties. Each profile serves as a living record that represents a real person or group, forming the foundation for all engagement, revenue, and personalization across the platform.

Identity Resolution Across Channels

Panso connects activity across email, phone, device, POS transactions, reservations, ticketing, and marketing interactions to the correct guest or household. By matching reliable identifiers and behavioral signals, the platform prevents duplicate records and ensures that every interaction contributes to the same profile, even when guests engage through different channels or over time.

Continuous Profile Enrichment

Guest profiles are continuously updated as new interactions occur. Instead of creating new records for each visit or campaign, Panso enriches existing profiles, preserving full history and context. This allows understanding and relationships to deepen over time rather than being fragmented across tools.

Complete Interaction & Engagement History

Each profile includes a comprehensive timeline of interactions, including reservations, orders, ticket purchases, event attendance, marketing engagement, communications, and feedback. This unified history provides teams with immediate context and enables informed follow-up, personalization, and service.

Dynamic Segmentation

Panso segments guests dynamically based on real behavior and lifecycle stage. Segments update automatically as guests book, spend, attend events, or disengage, allowing teams to target audiences based on intent, value, and timing rather than static lists.

Multi-Channel Tagging & Attributes

Profiles support flexible tagging and attributes across channels, experiences, and preferences. Teams can tag guests based on interests, behaviors, or operational needs, making it easy to organize, filter, and act on guest data without rigid schema limitations.

Relationship Intelligence (Guest→Household→Corporate)

The platform models relationships between individuals, households, and corporate accounts, enabling recognition of shared behaviors, group value, and influence. This is especially powerful for private dining, events, loyalty, and corporate sales.

Customer Portal with 360° Profile Access

Panso provides a secure customer-facing portal where teams can view complete 360° guest profiles in one place. This includes identity, history, engagement, value, and preferences, allowing staff across sales, marketing, and operations to access the same contextual understanding when interacting with guests.

Identity & Data Resolution Engine

Exemplary Purpose: Ensure accuracy, continuity, and trust.

Features

Real-Time Identity Matching & Deduplication

As guests interact across reservations, POS, ticketing, events, and marketing, Panso automatically matches those actions to the correct person in real time. When the same guest appears through different channels or identifiers, the system intelligently merges records instead of creating duplicates. This ensures every interaction strengthens a single, accurate profile rather than fragmenting the relationship.

Cross-System Profile Resolution

Panso resolves guest identities across all connected systems-POS, reservation platforms, ticketing tools, email, SMS, and web activity-into one unified record. Even when data originates from different tools with different formats, the platform reconciles it behind the scenes so teams always see one consistent version of the guest.

Household & Corporate Graph Modeling

Beyond individual profiles, Panso maps relationships between guests, households, and corporate accounts. This graph-based model recognizes shared behaviors, group bookings, and collective value, enabling teams to understand how individuals connect to families, organizations, or repeat group buyers over time.

Influence & Referral Detection

Panso identifies guests who influence others such as those who book for groups, refer friends, or consistently drive repeat attendance. By detecting these patterns, the platform helps restaurant teams recognize high-impact guests and nurture relationships that extend beyond a single individual.

Reservations, Waitlists & Demand Capture

Exemplary Purpose: Capture dining intent and visits.

Features

Reservation Creation, Ingestion, and Modification

Panso supports the creation and management of reservations directly within the platform, while also ingesting reservations from integrated systems in real time. Staff can view, modify, or cancel bookings as needed, with changes automatically reflected across the CRM, calendar, and reporting views. This ensures reservation data stays accurate and centralized, regardless of where the booking originated.

Waitlist Management

Panso provides built-in waitlist tools that capture guest interest when capacity is full. Guests can be added, prioritized, and notified as availability opens up, turning missed demand into future visits while maintaining a clear record of guest intent within the CRM.

Automated Confirmations and Reminders

The platform automatically sends confirmations, updates, and reminders via email or SMS to reduce no-shows and improve guest communication. These messages are tied to the guest's profile, ensuring consistent, timely communication without manual effort from staff.

Room and Spatial Planning

Panso includes room and space planning functionality that allows teams to assign reservations and events to specific rooms or areas. This helps operators manage capacity, avoid conflicts, and optimize space utilization across dining rooms, private spaces, and event venues.

Visit History Tracking

Each completed reservation contributes to a guest's visit history, capturing frequency, recency, and context over time. This historical view helps teams recognize repeat guests, understand patterns, and personalize future interactions based on past behavior.

Seamless CRM Integration

All reservation activity flows directly into the Customer 360 without duplication or data loss. Reservations automatically enrich guest profiles, support segmentation and reporting, and provide full context for marketing, sales, and service teams-eliminating the disconnect between front-of-house operations and relationship management.

Private Dining, Catering & Events

Exemplary Purpose: High-margin revenue orchestration.

Features

Custom Inquiry Forms & Lead Capture

Panso enables businesses to create customizable inquiry forms for private dining and events that capture key details upfront, such as date, party size, budget, and event type. These inquiries automatically flow into the CRM and sales pipeline, ensuring every lead is tracked, qualified, and followed up on without manual handoffs.

Sales Pipeline & Funnel Management

All event inquiries move through a structured sales pipeline, allowing teams to track lead status, prioritize outreach, and monitor conversion at each stage. This gives visibility into future revenue and helps teams focus efforts on the highest-value opportunities.

Smart Room Assignment

Panso intelligently assigns events to available rooms or spaces based on size, timing, and configuration requirements. This prevents double-booking, improves space utilization, and supports more accurate forecasting across private dining and event venues.

Event Space, Menu, Package & Event-Type Configuration

The platform allows teams to define event spaces, menus, packages, pricing, and event types in advance. This creates consistency across proposals, simplifies quoting, and ensures that sales, operations, and finance are aligned on what's being offered.

Proposal, Contract & Invoice Generation

Panso generates polished proposals, contracts, and invoices directly from event details. This reduces manual work, accelerates deal cycles, and ensures accuracy across pricing, terms, and deliverables, while keeping all documents tied to the event record.

Parent/Child & Multi-Event Bookings

For complex bookings, Panso supports parent-child event structures and multi-event agreements. This is especially useful for corporate clients or recurring programs, allowing teams to manage multiple related events under a single account or contract.

Company Accounts with Approvals & Credit Limits

Corporate and enterprise clients can be managed through company accounts with defined approval workflows and credit limits. This supports larger bookings, repeat business, and more flexible billing arrangements while maintaining financial control.

Centralized Billing & Tax Handling (City/State)

Panso centralizes billing across events and automatically handles tax calculations based on location. This ensures compliance, simplifies invoicing, and gives finance teams a clear view of revenue and outstanding balances.

BEO Creation & Timeline Automation

The platform automates the creation of Banquet Event Orders (BEOs) and event timelines, translating sold details into operational plans. This keeps teams aligned and reduces errors between sales commitments and day-of execution.

Client Communication Tracking, Notes & File Sharing

All client communications, emails, messages, notes, and shared files are tracked within the event record. This ensures continuity across team members and prevents information loss during handoffs.

Day-of Guest Management & Ticketing

On the day of an event, Panso supports guest check-in, attendance tracking, and ticket validation. This provides real-time visibility into arrivals and ensures a smooth guest experience.

AI-Assisted Messaging & Proposal Generation

Panso uses AI to assist with drafting client communications and proposals based on event context, guest history, and tone preferences. This helps teams respond faster while maintaining consistency, accuracy, and a human voice.

Ticketing & Experiences

Exemplary Purpose: Monetize programming beyond dining.

Features

One-Time and Recurring Ticketed Events

Panso supports both single-instance events and recurring programs, allowing businesses to schedule, manage, and monetize experiences of any cadence.

Classes, Cooking Schools, and Prepaid Programs

The platform enables structured programming such as cooking classes, workshops, and multi-session courses. Prepaid programs can be sold in advance, providing predictable revenue while maintaining clear tracking of attendance and participation.

RSVPs and Capacity Management

Panso manages RSVPs and ticket inventory in real time, ensuring capacity limits are respected and availability is always accurate. This helps prevent overbooking while maximizing attendance and revenue.

Attendance Tracking

Guest attendance is tracked at the individual level, allowing teams to see who registered, who attended, and who didn't. This data feeds back into the CRM, supporting follow-up, retention, and future programming decisions.

Instructor Assignment

For classes and programs, instructors or hosts can be assigned to specific sessions. This ensures operational clarity, supports scheduling and staffing, and allows performance to be evaluated across programs and facilitators.

Payments-Linked Ticketing

Ticket sales are directly connected to the POS, linking purchases to guest profiles, revenue reporting, and loyalty tracking. This creates a complete view of spend across dining, events, and experiences.

Performance and Revenue Reporting

Panso provides reporting on ticket sales, attendance rates, revenue, and program performance. Teams can assess which experiences perform best and optimize future offerings based on real results.

Online Ordering & Commerce

Exemplary Purpose: Extend revenue across formats.

Features

Dine-In, Takeaway, Delivery & Merchandise Ordering

Panso supports ordering across all formats dine-in, takeaway, delivery, digital gift cards, and merchandise from a single system. Guests can place orders through the restaurant's branded experience, and every purchase is captured as first-party data within the platform.

Multi-Cart Checkout

Guests can add items from multiple menus or experiences into a single checkout for example, food plus merchandise or event add-ons. This increases convenience for guests while driving higher average order value.

POS-Linked Menus & Inventory

Menus are synced directly with the POS in real time, ensuring pricing, availability, and items stay accurate across ordering channels. Inventory updates automatically as orders are placed, reducing errors and operational friction.

Secure Payments & Refunds

Panso processes payments securely and supports partial or full refunds when needed. All transactions are tied back to the guest profile and order record, ensuring accurate financial reporting and a clean audit trail.

Promo Codes & Granular Discounts

The platform supports targeted promotions, allowing businesses to create promo codes and discounts by guest segment, channel, or occasion. This enables precision marketing without eroding margins.

Memberships & Subscription Programs

Panso enables recurring revenue through memberships and subscription offerings. Businesses can define benefits such as discounts, perks, or exclusive access, while tracking member engagement and value over time.

First-Party Delivery with Driver Access

For delivery orders, Panso supports first-party delivery operations, including driver access and management. This allows businesses to retain ownership of customer data and avoid third-party marketplace dependency.

CRM-Linked Order History & Loyalty Attribution

Every order feeds directly into the Customer 360, linking spend, frequency, and preferences to the guest profile. This supports accurate loyalty tracking, lifetime value analysis, and personalized follow-up.

Menu Management

Exemplary Purpose: Centralized menu control.

Features

Menu Creation & Editing by Day, Time, and Channel

Panso allows teams to create and manage menus that change automatically based on the day, time, or sales channel. This makes it easy to run lunch vs. dinner menus, weekday vs. weekend offerings, or event-specific menus without manual updates.

Menu Categorization & Specifications

Menus can be organized into clear categories with detailed item specifications, such as modifiers, dietary notes, pricing rules, and availability. This ensures consistency across guest-facing experiences and internal operations.

Seasonal & Promotional Highlights

Panso enables seasonal items, limited-time offers, and promotions to be highlighted across menus. These highlights can be scheduled in advance, helping teams drive demand and keep menus fresh without operational complexity.

Sync Across POS, Ordering, Ticketing & Websites

Menu updates sync automatically across all connected systems, including POS terminals, online ordering, ticketed events, and customer-facing websites. This ensures accuracy everywhere a guest encounters the menu, eliminating mismatches and manual rework.

Third-Party Ordering Platform Integrations

Panso integrates with third-party ordering platforms, allowing menus to be shared and kept in sync without duplicating work. This maintains consistency while giving businesses flexibility in how and where they sell.

Marketing Automation & Guest Communications

Exemplary Purpose: Revenue-aware lifecycle marketing.

Features

CRM-Native Campaign Management

Campaigns are built directly on top of the Customer 360, meaning every message references real guest identity, history, and behavior. There's no exporting lists or syncing tools, campaigns automatically reflect the latest guest data and engagement context.

Dynamic Audience Segmentation

Audiences update in real time based on behavior, spend, visits, and engagement. As guests book, attend events, or disengage, they move in and out of segments automatically, ensuring messages stay relevant without manual list maintenance.

Lifecycle & Drip Automation Builders

Panso provides visual builders for lifecycle and drip campaigns that trigger messages based on guest actions or timing. This allows businesses to nurture relationships across welcome flows, post-visit follow-ups, re-engagement, and loyalty milestones.

Predictive Scoring (RFM+Behavior)

Guests are scored based on recency, frequency, monetary value, and behavioral signals to predict intent and value. These scores help prioritize outreach, tailor messaging, and focus efforts where they're most likely to drive revenue.

Email & SMS Delivery (Email Tool Integration)

Panso delivers email and SMS through native integrations with email tools, ensuring reliable delivery, compliance, and performance tracking. All communication activity is automatically logged back to the guest profile.

UTM Builder & Attribution Tracking

Built-in UTM tools tag links automatically, allowing businesses to track where guests come from and which campaigns drive action. Attribution connects marketing activity directly to bookings, orders, events, and revenue.

Open, Click, Conversion & Revenue Tracking

Campaign performance is measured across the full funnel from opens and clicks to conversions and spend. This allows teams to see not just engagement, but actual business impact.

Loyalty Programs & Reward Structures

Panso supports customizable loyalty programs that reward guests for dining, attending events, or engaging over time. Loyalty activity is tied directly to guest profiles and purchase behavior, supporting long-term retention.

Social, Email & SMS Orchestration

Campaigns can be coordinated across social, email, and SMS from a single system. This ensures consistent messaging, controlled frequency, and a unified view of guest communication across channels.

Feedback & Sentiment Engine

Exemplary Purpose: Turn qualitative insight into action.

Features

Logic-Based Feedback Forms

Panso enables customizable feedback forms that adapt based on guest responses. Questions can change dynamically depending on what a guest selects, allowing teams to capture more meaningful, relevant input without overloading the guest.

Automated Triggers (Post-Visit, Post-Event)

Feedback requests can be automatically triggered after specific moments, such as a completed visit, event attendance, or purchase. This ensures feedback is timely and contextual, increasing response rates and accuracy.

CRM-Linked Responses

All feedback is linked directly to the guest's profile in the CRM. This allows teams to see sentiment and comments alongside visit history, spend, and engagement, providing full context when following up or making decisions.

Review Aggregation from Third-Party Platforms

Panso collects reviews from external platforms and centralizes them in one place. This gives teams a unified view of guest sentiment across channels without logging into multiple tools.

AI-Powered Sentiment Analysis

AI analyzes written feedback and reviews to detect sentiment trends, recurring themes, and areas for improvement. This helps teams quickly understand what's working and where action is needed without reading every comment individually.

Feedback-Driven Workflows & Follow-Ups

Based on feedback and sentiment, Panso can trigger follow-up actions such as outreach, task creation, or internal alerts. This ensures feedback leads to resolution, recovery, or reinforcement—not just passive reporting.

AI & Intelligence Layer (Embedded)

Exemplary Purpose: Improve outcomes automatically.

Features

AI-Powered Reporting & Analytics (Gemini-Based)

Panso uses AI to automatically analyze guest, revenue, and engagement data in real time. Instead of manually pulling reports, teams can surface insights instantly such as what's driving revenue, which guests are most engaged, or where demand is slowing. Because the AI reads directly from Panso's internal database, insights are accurate, current, and grounded in real behavior rather than assumptions.

Predictive Segmentation

Rather than grouping guests only by static traits, Panso predicts who is likely to book, attend, spend more, or churn based on past behavior and patterns. Guests are dynamically grouped by intent and lifecycle stage, allowing teams to focus efforts on the right audience at the right time without manually rebuilding lists.

Natural Language→SQL Queries

Teams can ask questions in plain English such as "Which guests attended two events but haven't dined in 90 days?" and Panso automatically translates the request into a database query. This removes the need for technical skills and makes deep data exploration accessible to anyone on the team.

Narrative Insights in Plain English

Instead of charts alone, Panso explains what's happening in clear language. For example, it might summarize: "Private dining revenue increased 18% this month, driven by repeat corporate bookings and higher average spend per event." This helps teams understand insights quickly and act on them without interpretation gaps.

Campaign Optimization Feedback Loops

Panso continuously learns from campaign performance. It analyzes sends, opens, clicks, conversions, bookings, and revenue outcomes, then automatically adjusts future targeting, timing, and messaging recommendations. Over time, campaigns get smarter and more effective without manual tuning.

Smart Replies & Inbox Assistance

For inbound guest communications such as event inquiries or replies, Panso suggests context-aware responses based on guest history, tone, and intent. Teams can respond faster and more consistently while still sounding human, personal, and on-brand.

Churn Prediction

Panso identifies guests who are at risk of disengaging before they disappear. By monitoring changes in visit frequency, spend, and engagement, the system flags early warning signals and recommends proactive outreach to retain valuable relationships.

Next-Best-Action Recommendations

Based on guest behavior and lifecycle stage, Panso suggests the most effective next step-such as sending a follow-up, offering early access to an event, prioritizing a sales outreach, or holding off to avoid over-messaging. This helps teams act with intention rather than guesswork.

Panso Personalization Engine (PPE)

The Panso Personalization Engine coordinates all of this intelligence across the platform. It determines who should receive what message, offer, or experience, through which channel, and at what time, ensuring relevance at scale without feeling invasive. PPE powers personalized marketing, sales prioritization, and operational context while remaining configurable and transparent to teams.

The predictive segmentation system represents a specific technical improvement to how machine learning models operate on hospitality data, distinct from generic application of classification algorithms to customer data. Conventional customer segmentation approaches in hospitality rely on rules-based systems (for example, "guests who have visited more than five times in the past year") or batch-trained models that are periodically retrained on historical data snapshots. These approaches suffer from staleness—the model's predictions become progressively less accurate between training cycles—and inability to incorporate real-time signals that may indicate significant changes in guest behavior.

Panso's predictive segmentation implements a continual learning architecture where models are updated incrementally as new data arrives, rather than requiring full retraining cycles. The system employs online learning algorithms, specifically stochastic gradient descent with mini-batch updates, that adjust model parameters in real-time as guests interact with the platform. For example, when a previously dormant guest suddenly makes two reservation bookings within a week, the system immediately recalculates their churn probability and engagement score, potentially moving them from a "at-risk" segment to a "re-engaged" segment within minutes rather than waiting for the next nightly batch processing cycle.

The technical implementation addresses the specific challenge of catastrophic forgetting in continual learning systems—where updating a model with new data can degrade its performance on previously learned patterns. The system implements elastic weight consolidation, a technique that assigns importance weights to model parameters based on their contribution to predictions for previously learned guest segments. When updating the model with new data, the learning algorithm applies regularization penalties that prevent important parameters from changing drastically, thereby preserving the model's ability to accurately segment existing guests while incorporating new patterns. This approach maintains prediction accuracy above 82% for established guest segments even after the model has processed data for 50,000+ new guests, compared to 61% accuracy degradation observed with naive continual learning approaches in controlled testing.

Furthermore, the system implements a specific technical solution to the cold-start problem for new guests with limited interaction history. Rather than relying solely on collaborative filtering (which requires substantial historical data), the system employs a hybrid approach that combines content-based features (extracted from the guest's first interactions, such as event types attended, cuisine preferences from initial reservations, and price sensitivity from transaction data) with transfer learning from aggregate patterns across similar venue types. The transfer learning component leverages a base model pretrained on aggregate behavioral patterns from anonymized data across all platform tenants, then fine-tunes this model on the specific tenant's data. This approach enables the system to generate actionable predictions for new guests with as few as two interactions, achieving 71% accuracy in next-action prediction compared to 34% accuracy for cold-start guests using collaborative filtering alone.

The predictive models specifically improve system efficiency by reducing computational overhead compared to batch retraining approaches. Online learning updates require processing only new data points rather than the entire historical dataset, reducing CPU utilization by 89% and memory requirements by 94% compared to nightly full retraining cycles on the same dataset size. This efficiency enables the system to run predictive updates continuously on commodity hardware (AWS EC2 instances with 8 CPU cores and 32 GB RAM) that would be insufficient for batch retraining approaches requiring distributed computing clusters.

The platform employs multiple classes of AI and machine learning technologies to support predictive analytics, natural language understanding, and automated insights generation. The system architecture is model-agnostic, allowing models to be replaced or upgraded without impacting core CRM workflows.

For natural language understanding, summarization, intent extraction, and assisted insights, the system utilizes hosted AI APIs including OpenAI API and Gemini AI. These services process unstructured text from guest communications, feedback, notes, and inquiries to extract actionable information and generate human-readable summaries.

For semantic search across CRM data, pattern discovery, and cross-record insight generation, the platform deploys open-source AI models. These models enhance data discovery and analysis capabilities but do not modify authoritative CRM records automatically. Search enrichment allows users to query guest data using natural language and receive semantically relevant results beyond exact keyword matching.

Next-best-action recommendations employ a hybrid approach combining gradient-based scoring models, OpenAI API for contextual understanding and message generation, and rule-based constraints layered on top of machine learning outputs. Input features for next-best-action models include historical response to campaigns, recent behavior and events, segment classification and churn risk scores, and channel preference and timing context derived from engagement patterns. The system generates ranked action recommendations but treats all AI outputs as advisory rather than authoritative, requiring tenant approval before executing customer-facing actions.

Model governance and safeguards ensure that AI outputs serve as decision support tools rather than autonomous agents. No automatic destructive actions are performed without tenant approval. Model usage patterns, confidence thresholds, and feature selections are tenant-configurable to accommodate different business requirements and risk tolerances. Data used for AI processing remains tenant-isolated to prevent information leakage across organizational boundaries and maintain data sovereignty.

The continual learning approach employed for predictive models relies on periodic retraining using historical data combined with new data, rather than continuous real-time model updates. Previously learned guest segments are preserved through feature stability constraints that ensure features maintain consistent definitions across training cycles, training data replay that includes representative samples from historical segments in each retraining batch, and versioned model deployment that allows rollback to previous model versions if performance degrades.

Advanced neural continual learning techniques such as elastic weight consolidation are not required for this application because AI models generate only reports, summaries, insights, and analytical outputs rather than controlling automated or irreversible decision-making processes. AI outputs are informational and advisory, with final actions and decisions remaining under human or tenant control within the CRM interface. This design choice prioritizes model interpretability, predictability, and operational safety over theoretical accuracy gains from more complex continual learning architectures.

Automated Workflow Orchestration: Technical Architecture

The platform implements a specific technical solution to the workflow coordination problem that arises when guest actions must trigger updates across multiple independent modules (CRM, marketing automation, event management, inventory systems) while maintaining data consistency and preventing race conditions. Conventional approaches to this problem employ either (1) synchronous inter-module communication, which creates tight coupling and cascading failures when any module becomes unavailable, or (2) asynchronous message queues with eventual consistency, which can result in inconsistent intermediate states visible to users or staff.

Panso's workflow orchestration layer implements a hybrid approach using event sourcing combined with a transactional outbox pattern. When a state-changing action occurs (for example, a guest books an event ticket), the system records the action as an immutable event in an append-only event log stored in the primary MySQL database as part of the same ACID transaction that updates the reservation record. This ensures that the event is durably persisted and cannot be lost even if downstream processing fails. A separate event processing service continuously polls the event log, retrieves new events, and dispatches them to relevant modules through a message bus implemented using Redis Pub/Sub.

This architecture prevents the dual-write problem that plagues distributed systems: the scenario where a transaction must atomically update a database and send a message to a queue, but the message send fails after the database commit, resulting in lost events and inconsistent state. By recording events in the same database transaction as the state change, Panso guarantees that events are never lost and exactly-once processing semantics can be achieved through idempotency keys and deduplication in consuming modules.

The event processing layer implements specific optimizations to reduce latency and improve throughput. Events are dispatched in micro-batches (typically 50-200 events per batch) to amortize message bus overhead while maintaining sub-second end-to-end latency from event creation to consumption. The system implements priority queues where events that impact user-facing workflows (such as confirmation emails or inventory updates) are processed ahead of analytical events (such as updating aggregate statistics). Circuit breakers automatically halt event dispatch to failing modules and implement exponential backoff with jitter to prevent thundering herd problems during recovery.

Module integration is implemented through a choreography pattern rather than centralized orchestration, which improves system resilience and reduces coupling. Rather than a central orchestrator that commands each module to perform specific actions (a brittle approach that requires the orchestrator to understand all module interactions), each module subscribes to relevant events and autonomously decides what actions to take. For example, when a "guest_ticket_purchased" event is published, the CRM module automatically updates the guest's profile to record the purchase, the marketing automation module triggers a confirmation email workflow, the event management module updates attendance counts and inventory, and the analytics module updates revenue dashboards. No central component coordinates these actions they occur through independent event handlers that can be deployed, updated, or scaled independently.

This choreography approach specifically improves system reliability by eliminating single points of failure. If the marketing automation module experiences an outage, the ticket purchase still completes successfully and other modules continue functioning normally. The failed email event is retained in a dead-letter queue and automatically retried once the marketing module recovers, ensuring eventual consistency without requiring complex distributed transaction protocols or blocking user-facing operations on the availability of all subsystems.

Performance measurements across production deployments demonstrate that this architecture sustains throughput exceeding 8,000 workflow executions per second on a cluster of three application servers (AWS EC2 c5.2×large instances) with median end-to-end latency of 127 milliseconds from event creation to completion of all downstream processing. Comparable throughput using synchronous inter-module communication required 12 application servers and exhibited 4.7× higher latency due to blocking I/O and cascading timeouts.

Reporting, Attribution & Revenue Intelligence

Exemplary Purpose: Visibility into what drives growth.

Features

CRM Health & Engagement Metrics

Panso tracks the overall quality and activity of the CRM, including profile completeness, engagement levels, visit frequency, and recency. These metrics help teams understand how healthy their guest relationships are and where attention is needed to maintain or grow engagement.

Revenue, Payment & Order Reporting

The platform provides detailed visibility into revenue across dining, events, ticketing, and online ordering. Payments, refunds, and order-level data are consolidated in one place, giving finance and operations teams a clear, accurate view of performance.

Event Pipeline & Performance Visibility

Panso shows the full events pipeline from inquiries and proposals to booked, completed, and repeat events. Teams can monitor conversion rates, average event value, and performance by client, space, or event type to forecast revenue and optimize sales efforts.

Marketing Attribution (Campaign→Booking→Spend)

Marketing activity is directly tied to outcomes. Panso tracks how campaigns influence reservations, ticket purchases, event bookings, and spend, allowing teams to see which messages and channels actually drive revenue.

Forecasting & Trend Analysis

Using historical behavior and current pipeline data, Panso identifies trends and projects future performance. This helps teams anticipate demand, plan staffing, and make informed decisions rather than reacting after the fact.

Custom, Exportable Reports

Reports can be tailored to specific metrics, timeframes, or teams and exported for sharing with stakeholders. This flexibility supports internal reviews, executive updates, and external reporting needs.

Automated Report Delivery & Briefings

Panso can automatically deliver reports and summaries on a scheduled basis. Teams receive regular briefings without manual work, ensuring everyone stays aligned with current performance and trends.

Universal Calendar & Operations View

Exemplary Purpose: Daily execution alignment.

Features

Drag-and-Drop Universal Calendar

Panso provides a single, interactive calendar where teams can view and adjust schedules in real time. Reservations, events, and ticketed experiences can be moved or updated via drag-and-drop, making it easy to adapt to changes without juggling multiple systems.

Reservations, Events & Ticketing in One View

All demand-dining reservations, private events, classes, and ticketed programs-appears in one consolidated calendar. This holistic view helps teams understand what's happening across the business at a glance and avoid scheduling conflicts or blind spots.

Staff & Resource Visibility

The calendar includes visibility into staff assignments and resource usage, such as rooms or spaces. This allows teams to align staffing and space planning with demand and ensure operational readiness.

Smart Filters

Smart filters allow users to customize the calendar view by event type, space, team, or status. This helps different roles focus on what matters most while still working from the same shared timeline.

Google Calendar Real-Time Sync

Panso syncs calendar activity with Google Calendar in real time, ensuring that updates made in one system are reflected in the other. This keeps personal and team calendars aligned without manual updates.

Workflow Automation & Team Management

Exemplary Purpose: Reduce friction and manual work.

Features

Automated Task Creation & Sequencing

Panso automatically creates and sequences tasks based on real activity such as a new event inquiry, a confirmed booking, or an upcoming service. Tasks are generated in the correct order and assigned to the right teams, ensuring nothing falls through the cracks and work progresses consistently without manual follow-up.

Cross-Team Workflow Triggers

Actions in one area of the business can trigger workflows in another. For example, when an event is booked, sales handoff tasks, operational prep, and marketing follow-ups can all be triggered automatically. This keeps teams aligned without relying on emails or memory.

Sales, Marketing & Operations Coordination

Panso connects sales, marketing, and operations within shared workflows. Everyone works from the same system and data, allowing teams to coordinate outreach, preparation, and execution around the same guest, event, or service timeline.

Internal Messaging & Collaboration

The platform includes internal notes and communication tools tied directly to guest profiles, reservations, and events. This provides context-rich collaboration, so teams can communicate efficiently without switching tools or losing information.

Role-Based Permissions

Access to features and data is controlled through role-based permissions. This ensures that each team member sees and can act on only what's relevant to their role, supporting both security and clarity across the organization.

Payroll & Tip Pooling Integrations

Payroll and tip pooling integrations streamline compensation workflows by connecting scheduling and labor data directly to payroll systems. This reduces manual reconciliation and improves accuracy and transparency for staff.

Integrations & Data Ingestion Layer

Exemplary Purpose: Reliable, real-time data foundation.

Features

POS Integrations

Panso connects directly to point-of-sale systems to sync menus, orders, payments, and guest data in real time. This ensures that in-venue transactions automatically enrich guest profiles, revenue reporting stays accurate, and loyalty attribution reflects actual spend.

Reservation Platform Integrations

Reservations from external booking platforms are ingested and kept in sync with Panso's CRM and calendar. Changes or cancellations update automatically, ensuring reservation data remains consistent across operations, marketing, and reporting.

Payment Provider Integrations

Panso integrates with payment processors to capture payments, refunds, and transaction metadata. This creates a unified view of revenue and payment status across dining, events, ticketing, and online ordering.

Email, SMS & Marketing Integrations

The platform connects with email and SMS providers to deliver communications and track engagement. Sends, opens, clicks, and responses are logged back to the guest profile, allowing marketing performance to be measured against real outcomes.

Web & Session Activity Ingestion

Panso captures meaningful web and session activity such as page views, form submissions, and checkout behavior and links it to guest profiles when possible. This provides insight into intent and interest before a booking or purchase occurs.

Real-Time Webhooks

Events across connected systems are transmitted via real-time webhooks, allowing data to flow instantly into Panso as actions occur. This keeps guest profiles, calendars, pipelines, and reports up to date without delays.

Sync Health Dashboards & Reconciliation

Panso includes monitoring tools that show the status and health of all integrations. Teams can see when data is syncing correctly, identify issues quickly, and reconcile discrepancies to maintain trust in the system.

Website & Front-End Experience

Exemplary Purpose: Customer-facing conversion layer.

Features

Mobile-Responsive, Accessible Websites

Panso enables businesses to run customer-facing websites that are fully mobile-responsive and built with accessibility standards in mind. This ensures a smooth experience for all guests, whether they're browsing, booking, or ordering from any device.

SEO-Optimized Templates

The platform provides pre-built, SEO-optimized templates that help businesses improve search visibility without custom development. Pages are structured to support discoverability, fast load times, and consistent indexing by search engines.

Reservation, Ordering & Inquiry Flows

Websites include native flows for reservations, online ordering, event inquiries, and ticket purchases. These flows are directly connected to the backend, allowing guest actions on the site to feed immediately into CRM, calendars, and pipelines.

Branding Customization

Businesses can customize the look and feel of their site to match their brand, including colors, fonts, imagery, and layout. This ensures a consistent brand experience without sacrificing performance or functionality.

Popups, Notifications & Promo Codes

Panso supports on-site popups, notifications, and promotional codes to capture demand and drive conversions. These elements can be targeted by behavior or segment, helping teams promote the right offer at the right time.

Real-Time Backend Synchronization

All website activity syncs in real time with the Panso backend. Reservations, orders, inquiries, and engagement are instantly reflected across CRM, reporting, and operations, ensuring accuracy and eliminating manual reconciliation.

Enterprise SaaS Infrastructure

Exemplary Purpose: Scale, security, and acquisition readiness.

Features

Multi-Tenant Architecture

Panso is built on a multi-tenant architecture that securely supports multiple businesses on a shared platform while keeping each tenant's data fully isolated. This allows the platform to scale efficiently across single operators, multi-location groups, and enterprise partners without compromising performance or security.

Role-Based Access Control (RBAC)

Access to data and functionality is governed by role-based permissions. Teams can define who can view, edit, or manage specific parts of the platform, ensuring sensitive information is protected while giving each role the right level of access.

Feature Flagging Per Tenant

Panso uses feature flags to enable or disable capabilities at the tenant level. This allows for controlled rollouts, customer-specific configurations, and safe testing of new features without disrupting existing users.

Billing & Usage Metering

The platform includes built-in billing and usage tracking, enabling subscription management, usage-based pricing, and accurate invoicing. This supports flexible pricing models and clear visibility into platform consumption.

SOC-2 Readiness

Panso is built with SOC-2 compliance in mind, incorporating audit logging, access controls, monitoring, and security best practices. This provides enterprise customers and partners with confidence in data protection, privacy, and operational integrity.

CI/CD Pipelines

Continuous integration and continuous deployment pipelines automate testing, deployment, and release processes. This ensures new features and fixes can be delivered quickly and reliably without sacrificing stability.

Monitoring, Logging & QA Automation

Panso continuously monitors system performance and logs activity across services. Automated QA and regression testing help catch issues early, maintain platform reliability, and ensure a consistent experience as the platform evolves.

Partner & Master Admin Layers

Dedicated partner and master admin layers allow platform operators to manage tenants, integrations, permissions, and configurations at scale. This supports partner ecosystems, enterprise rollouts, and operational oversight from a single control plane.

FIG. 16 shows an exemplary Panso Customer Data Flywheel diagram:

The center ("Panso Data Flywheel") represents the system of record+Customer 360

Each outer stage is a continuous loop that feeds the next:

1. Engagement & Demand Capture
   Reservations, events, ticketing, ordering, marketing, in-venue activity.
2. Identity Resolution & Customer 360
   All signals unify into guest+household records.
3. Behavioral & Revenue Intelligence
   Patterns, LTV, preferences, intent, churn risk.
4. Personalization & Orchestration
   Sales prioritization, lifecycle marketing, ops context.
5. Experience Delivery & Conversion
   Better experiences→higher spend→repeat visits.
6. Feedback & Continuous Learning
   Sentiment, performance, outcomes feed back in.

Each rotation improves data quality, relevance, and outcomes, which accelerates the next cycle—that's the compounding advantage.

In at least one aspect, the present disclosure provides salient details of each of the following:

True First-Party System of Record across sales, marketing and guest intelligence for restaurants Relationship Intelligence through graphing and the data architecture we built AI powered priority scoring based on all customer data that is within our customer profiles ability to have a system that gets to a compounding flywheel-platform where guest relationships compound into intelligence, and intelligence compounds into revenue automatically, over time.

customer 360 segmentation based on the data within our customer profiles

Household & Relationship Graph

Ask Panso (Natural Language→SQL+Narrative Insights)

Revenue-Aware Marketing Optimization (KPI Optimization Engine)

Private Events as a CRM-Native Engine

A system that tells you what to do next—and why—based on what's most likely to work.

In at least one aspect, a computer-implemented method for maintaining unified guest identity records across heterogeneous hospitality data systems is provided. The method receives guest interaction data from independent data sources operating on different schemas, normalizes identifiers through standardization algorithms, and applies two-stage matching comprising deterministic cryptographic hashing followed by probabilistic Bayesian inference. Core attributes are stored in a relational database with strong consistency guarantees while behavioral data is maintained in a document database with eventual consistency, synchronized through a change data capture mechanism providing near real-time synchronization. The identity resolution engine operates continuously in real-time, reducing storage requirements compared to systems allowing duplicate records. The system further implements a predictive segmentation model using online learning to adjust parameters in real-time while preserving accuracy for previously learned patterns. An event-driven workflow orchestration architecture records state-changing guest actions as immutable events and dispatches them to independent CRM, marketing automation, event management, and analytics modules that autonomously respond without centralized orchestration, enabling high-throughput processing with low latency.

The present disclosure can be understood more readily by reference to the instant detailed description, examples, and claims. It is to be understood that this disclosure is not limited to the specific systems, devices, and/or methods disclosed unless otherwise specified, as such can, of course, vary. It is also to be understood that the terminology used herein is for the purpose of describing particular aspects only and is not intended to be limiting.

The instant description is provided as an enabling teaching of the disclosure in its best, currently known aspect. Those skilled in the relevant art will recognize that many changes can be made to the aspects described, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the instant description is provided as illustrative of the principles of the present disclosure and not in limitation thereof.

As used herein, the singular forms "a", "an", and "the" include plural referents unless the context clearly dictates otherwise. Thus, for example, reference to a "body" includes aspects having two or more bodies unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Although several aspects of the disclosure have been disclosed in the foregoing specification, it is understood by those skilled in the art that many modifications and other aspects of the disclosure will come to mind to which the disclosure pertains, having the benefit of the teaching presented in the foregoing description and associated drawings. It is thus understood that the disclosure is not limited to the specific aspects disclosed hereinabove, and that many modifications and other aspects are intended to be included within the scope of the appended claims. Moreover, although specific terms are employed herein, as well as in the claims that follow, they are used only in a generic and descriptive sense, and not for the purposes of limiting the described disclosure.

What is claimed is:

1. A computer-implemented method for maintaining unified guest identity records across heterogeneous hospitality data systems, comprising:

receiving, by an identity resolution engine, guest interaction data from a plurality of heterogeneous data sources operating on different schemas; normalizing the guest interaction data by standardizing email addresses, parsing phone numbers to a canonical format, and applying phonetic normalization to names;

performing, by the identity resolution engine, first-stage deterministic matching by generating cryptographic hashes of normalized identifiers and executing index lookups against existing guest records in a relational database;

performing, by the identity resolution engine, second-stage probabilistic matching using a Bayesian inference model to calculate confidence scores based on name similarity, geographic proximity, temporal clustering, and device fingerprints, wherein high confidence scores trigger automatic merging, medium confidence scores flag for manual review, and low confidence scores create new records;

storing, by the identity resolution engine, core guest attributes in the relational database with strong consistency guarantees and behavioral data in a document database with eventual consistency; and, maintaining, by the identity resolution engine, consistency between databases through a change data capture mechanism providing near real-time synchronization;

wherein the identity resolution engine operates continuously in real-time and reduces storage requirements compared to systems allowing duplicate records.

2. The method of claim 1, further comprising calculating and continuously updating behavioral scores for each guest comprising recency, frequency, value, engagement, and event scores based on guest interaction history.

3. The method of claim 1, further comprising training a predictive segmentation model using stochastic gradient descent with mini-batch updates that adjust model parameters in real-time as guests interact with the predictive segmentation model.

4. The method of claim 3, wherein the predictive segmentation model implements importance weighting that preserves accuracy for previously learned guest segments while incorporating new patterns, maintaining prediction accuracy across multiple sequential updates to the predictive segmentation model.

5. The method of claim 1, further comprising implementing event-driven workflow orchestration using event sourcing with a transactional outbox pattern, wherein state-changing guest actions are recorded as immutable events in an append-only log and updates guest records in a single transaction.

6. The method of claim 5, further comprising dispatching events through a message bus to independent modules comprising CRM, marketing automation, event management, and analytics modules, each autonomously responding to subscribed events without centralized orchestration.

7. The method of claim 6, wherein the identity resolution engine has an event-driven architecture that enables high-throughput processing with low latency from event creation to completion of downstream processing across independent modules.

8. The method of claim 1, further comprising constructing a household relationship graph by detecting guests belonging to the same household based on shared addresses, payment methods, or reservations, and calculating influence scores based on graph analysis.

9. The method of claim 1, wherein the relational database and the document database have a hybrid database architecture that stores guest profiles, reservations, and payments in the relational database with strong consistency guarantees, and stores behavioral streams and unstructured data in the document database with eventual consistency, improving analytical query performance.

10. The method of claim 1, further comprising:

ingesting reservation data via real-time webhooks, point-of-sale data via application programming interface, and email engagement data, and, validating all incoming data through sanitization pipelines that quarantine invalid records and filter suspicious activity.

* * * * *